July 20, 1965  R. E. CHARLWOOD ETAL  3,195,456
TIMING AND SEQUENCING CONTROL SYSTEM FOR SHEET
FED ROTARY PRINTING PRESS
Filed Nov. 18, 1963  11 Sheets-Sheet 1

July 20, 1965  R. E. CHARLWOOD ETAL  3,195,456
TIMING AND SEQUENCING CONTROL SYSTEM FOR SHEET
FED ROTARY PRINTING PRESS
Filed Nov. 18, 1963  11 Sheets-Sheet 2

July 20, 1965

R. E. CHARLWOOD ETAL 3,195,456

TIMING AND SEQUENCING CONTROL SYSTEM FOR SHEET
FED ROTARY PRINTING PRESS

Filed Nov. 18, 1963

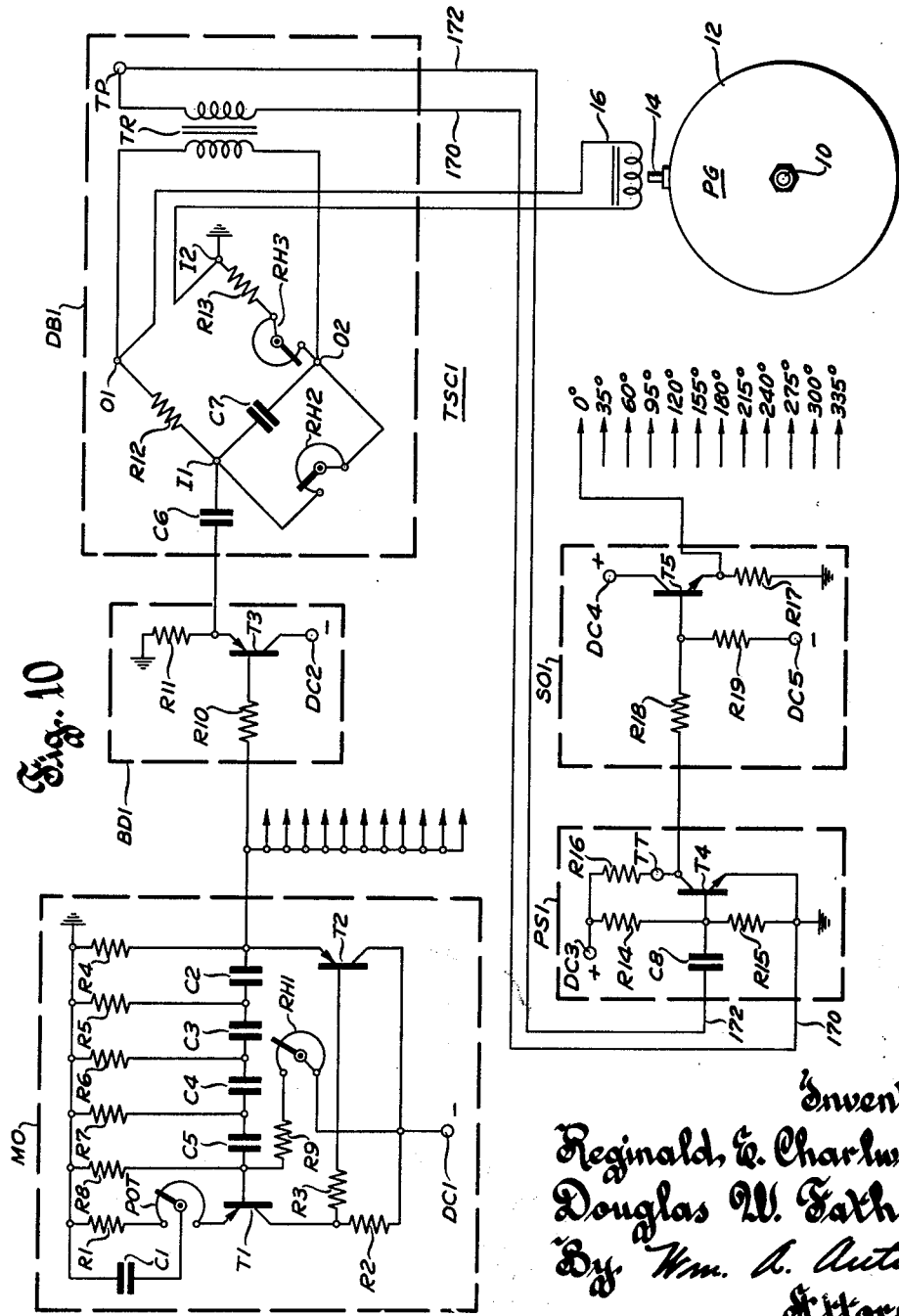

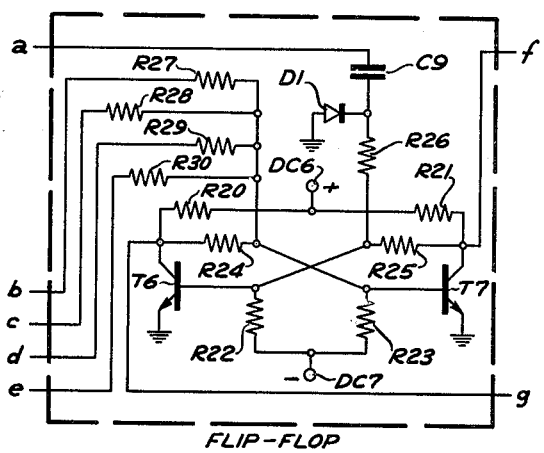
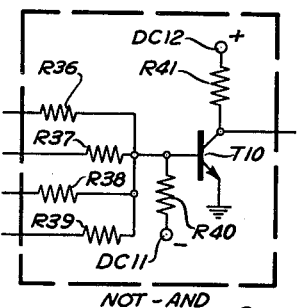
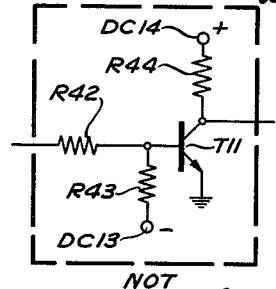
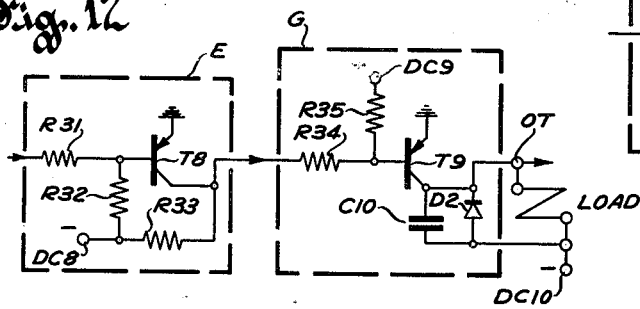
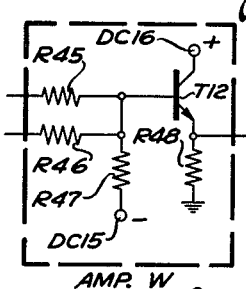
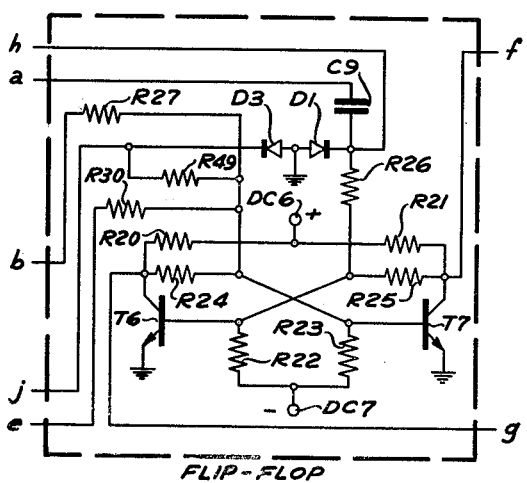
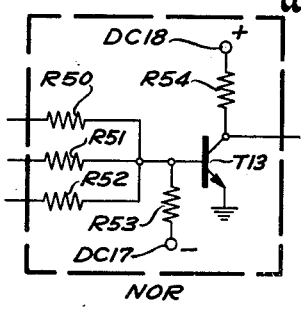

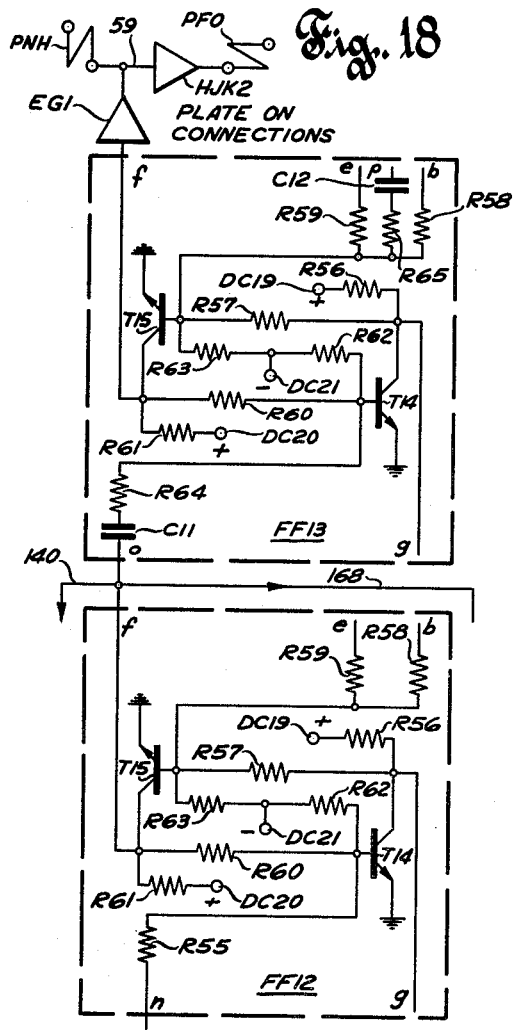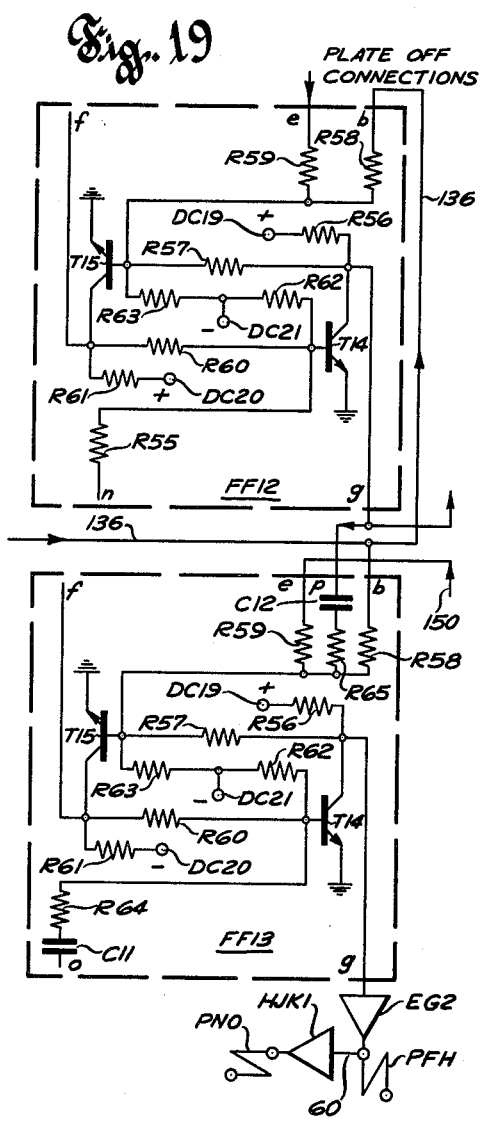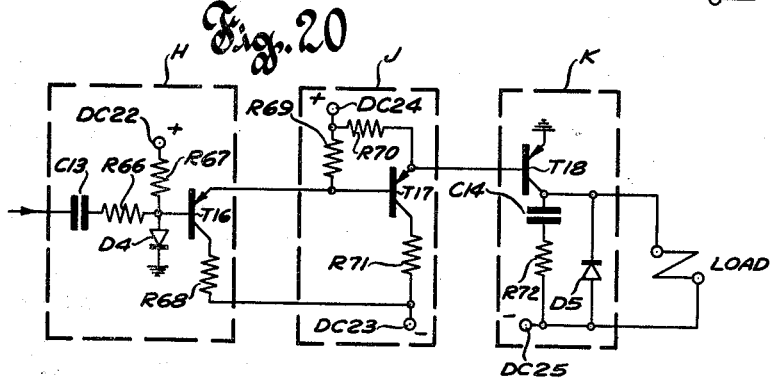

United States Patent Office 3,195,456
Patented July 20, 1965

3,195,456
TIMING AND SEQUENCING CONTROL SYSTEM
FOR SHEET FED ROTARY PRINTING PRESS
Reginald E. Charlwood, Menomonee Falls, and Douglas W. Fath, Brookfield, Wis., assignors to Cutler-Hammer, Inc., Milwaukee, Wis., a corporation of Delaware
Filed Nov. 18, 1963, Ser. No. 324,431
16 Claims. (Cl. 101—184)

This invention relates to timing and sequencing control systems and more particularly to systems of the static logic type for controlling timing cycles and unit sequence operations of plural-unit devices.

While not limited thereto, the invention is especially applicable to printing press control systems for controlling timing and sequential functions of plural-unit, sheet-fed printing presses of the offset type.

An object of the invention is to provide improved electrical means for controlling timing cycles and unit sequence functions of plural-unit devices.

A more specific object of the invention is to provide improved electrical means for controlling timing cycles of a plural-unit printing press.

Another specific object of the invention is to provide improved electrical means for controlling sequential functions of a plural-unit printing press.

Another object of the invention is to provide an improved static logic system for controlling timing cycles and unit sequence operations of a plural-unit, sheet-fed printing press.

Another object of the invention is to provide such system with improved electrical means for controlling pre-inking of the press without feeding paper thereinto.

Another object of the invention is to provide such system with improved electrical means for feeder control and speed control whereby to initiate or terminate feeding of sheets of paper into the press and to accelerate or decelerate the press.

Another object of the invention is to provide such feeder and speed control means with improved electrical means at the press units for terminating the feeding of sheets and decelerating the press.

Another object of the invention is to provide such system with improved electrical means under manual control for controlling application of rolling pressure to the printing plates before printing is performed.

Another object of the invention is to provide such system with improved electrical means under manual control for taking any desired press unit out of service so that it will not print the sheets passing therethrough.

Another object of the invention is to provide such system with improved electrical means which will respond to a lost sheet signal to terminate the feeding of sheets into the press and to decelerate the press when the last sheet has passed therethrough.

Other objects and advantages of the invention will hereinafter appear.

According to the invention, there is provided a timing cycle and unit sequence control system of the static logic circuit type for controlling a plural-unit printing press of the sheet-fed, offset printing type. The system is provided with a plurality of timing signal circuits supplied from a master oscillator and operated by a timing drum or pulse generator driven in synchronism with the press to provide a plurality of angularly-spaced timing signals to afford timing cycle and unit sequence control of the press. The timing signals are arranged so that the press is provided with a timing cycle of 660 degrees of press rotation, that is, more than one revolution and less than two revolutions, the timing cycle being defined as the rotation required to transport a sheet of paper from a point in one unit of the press to a similar point in the next unit of the press. A feeder control circuit is provided which is operable from a three-position manual trip-slow switch to control the feeding of sheets and acceleration of the press to printing speed. The feeder control circuit is provided with feeder-trip and master-trip control devices manually operable at the press units to afford control under abnormal conditions. The feeder-trip control devices are used when an abnormal condition occurs and is observed to stop the feeding of sheets and to decelerate the press when the last sheet has cleared the latter and to control restoration of the press units to non-printing conditions in their normal consecutive sequence. The master-trip control devices are used when a more serious abnormal condition occurs to stop the feeding of sheets and to decelerate the press immediately and to control restoration of the press units to no-printing conditions sooner than their normal sequence, that is, in accordance with the next unit timing signals that are applied.

Each press unit is provided with static logic printing function control circuits for performing plate-on, ink-on and impression-on control functions in sequence to enable the press units to go into printing conditions. Each press unit is also provided with static logic non-printing condition control circuits for performing plate-off, ink-off and impression-off control functions in sequence to enable the press units to go into non-printing conditions. Each press unit except the first one is further provided with static logic circuits for performing preset-on and preset-off control functions in sequence following the impression-on and impression-off control functions of the respectively preceding press units to preset the plate-on and plate-off control circuits, respectively, of the associated press units and to prevent out of proper sequence operation of the static logic unit sequence control circuits of the successive press units. These static logic circuits are operated in their proper sequence under the control of the timing signals and the preset control circuits. The feeder control circuit is provided with means for presetting the plate-on and plate-off control circuits of the first press unit for operation.

The system is provided with a static logic, blanket roll-up control circuit and revolution counter for controlling pre-inking of the press for a selected number of revolutions without feeding sheets and without the press going on impression. Each unit of the press is provided with a plate-up control circuit for controlling application of rolling pressure from the blanket cylinder on the printing plate following installation of the latter without either ink or impression being applied. Each unit of the press is provided with a manual control circuit for maintaining the respective unit sequence control circuits in "off" condition thereby to provide for selectively placing any press unit in its non-printing condition thereby to take it out of service. A power-off reset control circuit is provided for resetting the static circuits of the system to their normal conditions when power is reapplied after the power fails or is turned off when the press is operating. The feeder control and unit sequence control circuits are provided with means which respond to receipt of a lost sheet signal for stopping the feeding of sheets, to decelerate the press when the last sheet has cleared the latter and for controlling restoration of the press units to non-printing conditions in their normal sequence.

These and other objects and advantages of the invention and the manner of obtaining them will best be understood by reference to the following description of an embodiment of the invention taken in conjunction with the accompanying drawings, wherein:

FIG. 10 is a circuit diagram showing certain details of the timing signal portion of the block diagram of FIG. 4;

FIGS. 11 through 22 are circuit diagrams showing details of portions of the block diagram of FIGS. 5 through 9.

Figure 1:
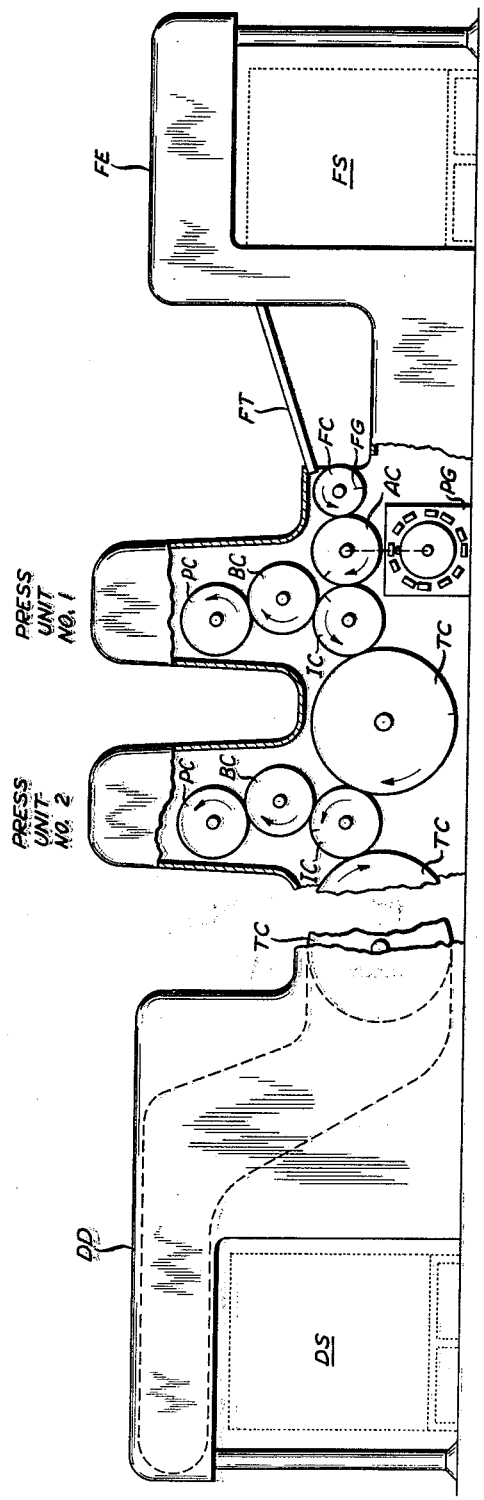
FIGURE 1 is an elevational view of one side of a portion of a plural-unit printing press to control of which the invention may be applied.

Referring to FIG. 1, there is shown a portion of a plural-unit printing press of the offset multi-color type. While the press may have from one to six units or more, such as four or six or the like, only a portion of the possible total units have been shown to avoid unnecessary duplication. As shown in FIG. 1, the press is provided at the right-hand end thereof with a feeder FE wherein sheets of paper to be printed are contained in a stack FS. The feeder feeds the sheets one at a time in the left-hand direction along a downwardly inclined feed table FT to a feed cylinder FC. As each sheet approaches the feed cylinder it may be registered, that is, it may be positioned laterally so that it will enter the press in the correct lateral position. The feed cylinder moves the sheets to an advance cylinder AC which then moves the sheets into the first unit of the press.

Each unit of the press comprises a plate cylinder PC, a blanket cylinder BC and an impression cylinder IC, which are shown as being of the same diameter and are driven in unison. Each unit of the press also comprises ink transfer rolls or the like, not shown, adjacent to and above the plate cylinder for applying ink to the printing plate mounted on the plate cylinder. A transfer cylinder TC is provided for each unit of the press for moving the sheets from one unit to the next and away from the last unit of the press to a delivery device DD at the extreme left-hand end of the press. As shown in FIG. 1, transfer cylinder TC is mounted between and slightly lower than the impression cylinder of the first unit of the press and the impression cylinder of the next unit. The other transfer cylinders are similarly arranged. The delivery device receives the sheets from the last transfer cylinder and conveys them to a delivery stack DS. The diameter of the transfer cylinder is shown in FIG. 1, as being twice as large as the diameter of of the impression cylinder. The advance cylinder is shown as having the same diameter as the impression cylinder. The feed cylinder has a smaller diameter than the impression cylinder for reasons hereinafter described.

As shown in FIG. 1, advance cylinder AC is connected to drive a timing drum or a timing pulse generator PG in unison therewith for purposes hereinafter described. The advance, plate, blanket and impression cylinders of the press units and pulse generator are driven at the same speed so that they rotate the same number of revolutions. The transfer cylinders are driven at one-half the speed of the pulse generator so that the pulse generator rotates two revolutions for each revolution of the transfer cylinders. The feed cylinder being of smaller diameter than the advance cylinder may be driven with intermittent motion so that it stops for a period of dwell while a sheet of paper is being fed thereto and then rotates to move the sheet to the advance cylinder.

The sheets of paper travel over the feed cylinder, under the advance cylinder and are printed as they pass between the blanket and impression cylinders of the first press unit. The sheets are then moved under the first transfer cylinder and between the blanket and impression cylinders of the second press unit for a second printing or printing of a second color thereon. In a similar manner, the sheets move between the blanket and impression cylinders of each press unit in succession and beneath the transfer cylinders of adjacent press units to the delivery device.

The feed, advance, impression and transfer cylinders are normally provided with rows of gripper fingers for gripping the leading edge of the sheets so that the sheets will not slip out of registration when the cylinders rotate and advance the sheets through the press. These gripper fingers may be actuated by the press or cylinder drive or in response to rotation of the associated cylinder by gears, cams or the like to separate the tips of the fingers from the cylinder and to press the tips of the fingers tightly against the cylinder when the cylinder starts to rotate the gripper fingers away from the point where the leading edge of the sheet may enter therebetween. Thus the fingers grip the leading edge of the sheet and pull it around the cylinder as the latter rotates.

As aforementioned, feed cylinder FC is driven intermittently in the counterclockwise direction by a Geneva movement drive or the like. During the dwell period of the feed cylinder a sheet is fed along the inclined feed table to gripper fingers FG on the feed cylinder. These gripper fingers grip the sheet and the feed cylinder then rotates counterclockwise and pulls the sheet over its left-hand upper portion to the advance cylinder. The cylinders are driven in synchronism so that the gripper fingers of the advance cylinder arrive at the proper position at the same time as the leading edge of the sheet arrives thereat. The gripper fingers of the advance cylinder then pull the sheet around the lower side of the advance cylinder as the latter rotates clockwise to the gripper fingers of the impression cylinder. At this point the gripper fingers of the advance cylinder release the sheet and the gripper fingers of the impression cylinder grip the leading edge of the sheet and pull it around the upper side of the impression cylinder as the latter rotates counterclockwise. During this movement, the blanket cylinder prints the sheet. When the leading edge of the printed sheet arrives at substantially the tangential point between cylinders IC and TC, it is released by the gripper fingers of the impression cylinder and is gripped by the gripper fingers of the transfer cylinder. Alternate sheets are gripped by the opposite sets of fingers on the transfer cylinder. As the transfer cylinder rotates in the clockwise direction, it pulls the sheet around the lower side thereof to the impression cylinder in the second press unit. In a similar manner the sheet is printed in each succeeding press unit and is transferred to the next press unit by the transfer cylinder between adjacent units. The last transfer cylinder receives the sheet from the last press unit impression cylinder and moves it to the delivery device which delivers the sheet to the stack.

Figure 3:
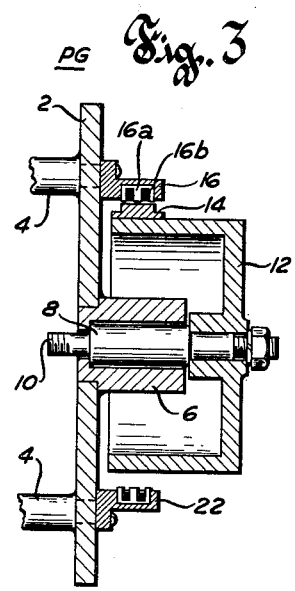
FIGS. 2 and 3 show front elevational and cross-sectional views respectively of a timing signal pulse generator operable by the printing press of FIG. 1.
Figure 2:
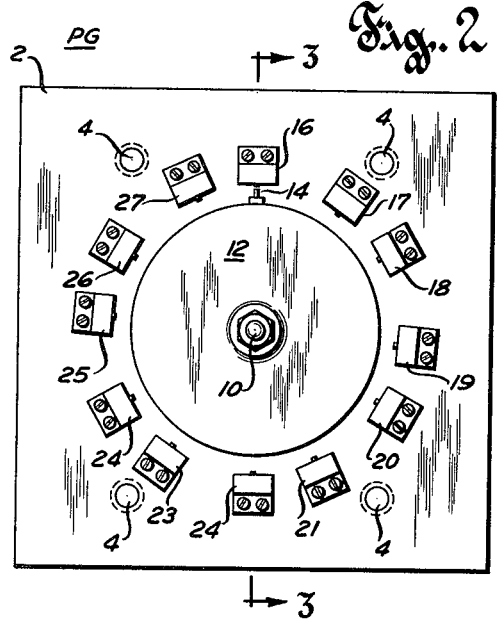

Pulse generator PG, shown in FIG. 1, is shown in more detail in FIGS. 2 and 3. This pulse generator is of the synchronous type in that it is driven in synchronism with press rotation. As shown in FIGS. 2 and 3, the pulse generator consists primarily of a rotatable drum having an armature mounted thereon and a plurality of electromagnets mounted in distributed relation around the drum. As shown in FIG. 3, a mounting plate 2 is rigidly secured to a plurality of stationary mounting brackets 4 or the like. A journal or bushing 6 is rigidly secured centrally in a hole in mounting plate 2 and has a hole extending therethrough. A bearing 8 is mounted in bushing 6 and a shaft 10 extends through the bushing and bearing to the other side of mounting plate 2. A drum 12 is rigidly secured to the right-hand end of shaft 10 as seen in FIG. 3, so that the drum rotates when the shaft is driven from its left-hand end. A single armature 14 comprising a bar of magnetizable material is rigidly secured to the periphery of drum 12. Twelve electromagnets 16 through 27 are mounted onto mounting plate 2 around drum 12. Electromagnets 16–27 are mounted so that there is a small magnetic air gap relation between each electromagnet and armature 14 as the latter sweeps past the electromagnets during drum rotation. As shown in FIG. 3, each electromagnet comprises an E-shaped core 16a of magnetizable material such as laminated iron sheets or the like and a coil 16b wound around the center leg of the core. The manner in which the electromagnets are connected in the system will become apparent as the description proceeds.

FIGS. 4 through 9, when arranged in order from the left to the right comprise a schematic and block diagram illustration of a timing cycle and unit sequence control system for a six unit press. FIGS. 4 through 8 connect at their right-hand sides to the left-hand sides of FIGS. 5 through 9, respectively. The system in FIGS. 4 through 9 comprises primarily (1) circuits for developing timing signals or pulses shown in FIG. 4, (2) circuits for controlling feeder FE and for controlling press acceleration and deceleration shown in FIG. 5, (3) circuits for controlling blanket roll-up, that is, for controlling press operation a selected number of revolutions for pre-inking shown in FIGS. 5 and 6 and (4) circuits for unit sequence control, that is, for controlling a plurality of operations in each unit of a six unit press in the proper sequence shown in FIGS. 6 through 9.

Figure 4:
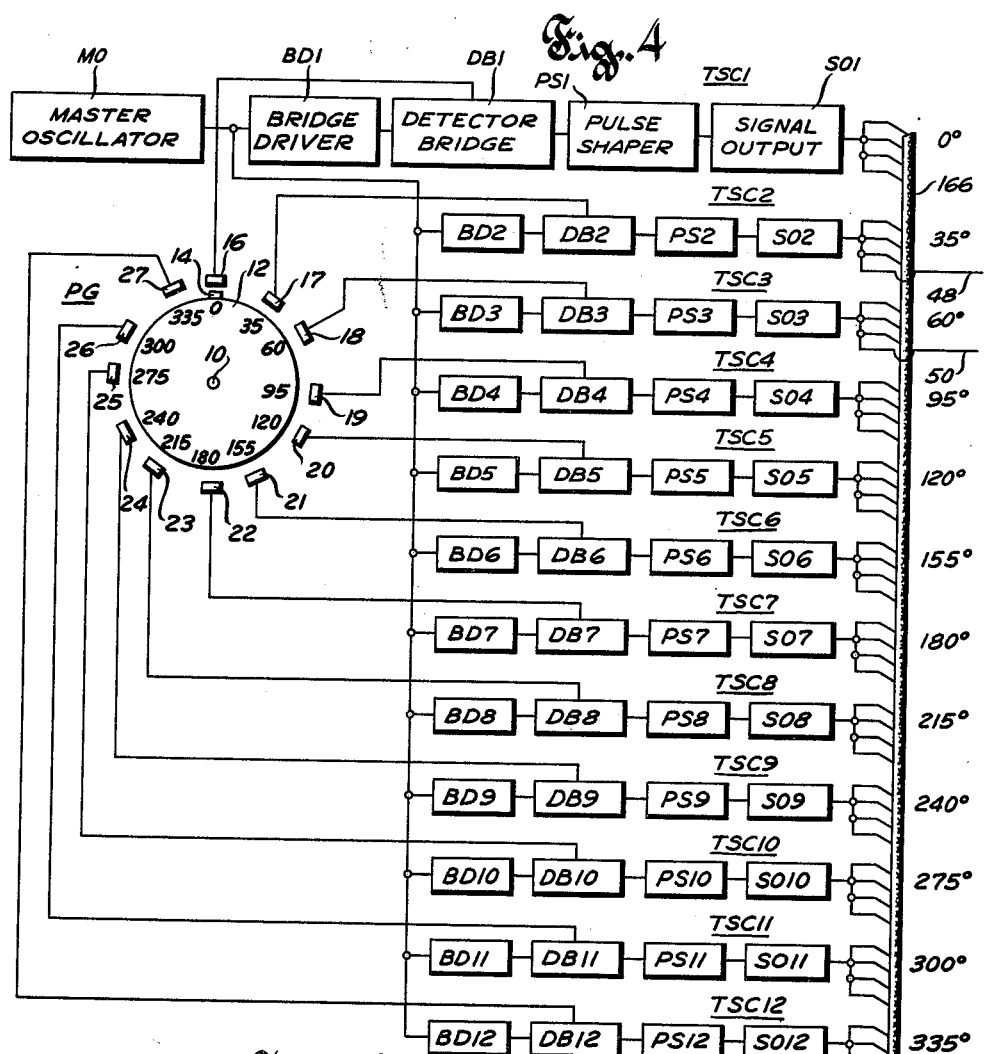
FIGS. 4 through 9 illustrate in schematic and block diagram form a printing press timing and sequencing control system in accordance with the invention.

Referring to FIG. 4, there is shown a master oscillator MO for supplying an audio frequency voltage such as 7000 cycles or the like to twelve timing signal developing circuits TSC1 through TSC12 in parallel. Each timing signal circuit such as TSC1 comprises a bridge driver BD1, a detector bridge DB1, a pulse shaper PS1 and a signal output circuit SO1. The other timing signal circuits have similar bridge drivers BD2 through BD12, detector bridges DB2 through DB12, pulse shapers PS2 through PS12, and signal output circuits SO2 through SO12. Pulse generator PG, shown in FIGS. 1, 2 and 3 is also shown schematically in FIG. 4. As shown in FIG. 4, pulse generator PG is provided with twelve stationary electromagnetic coils 16–27, that is, one coil for each timing signal circuit. These electromagnetic coils or electromagnets are positioned at 0, 35, 60, 95, 120, 155, 180, 215, 240, 275, 300 and 335 degree positions around the drum of the pulse generator and are connected to detector bridges DB1 through DB12, respectively. The detector bridges are of the Maxwell type and are adjusted or balanced so that they normally provide no output signals. The master oscillator supplies alternating current through the bridge drivers to the detector bridges. As drum 12 of pulse generator PG rotates in synchronism with advance cylinder AC of the press, armature 14 sweeps past electromagnets 16–27 in succession and in repetitive cycles. Each time that armature 14 sweeps past an electromagnet, the associated detector bridge is unbalanced whereby it provides an output signal. The output signals of the detector bridges consist of spurts of alternating current of the frequency of master oscillator MO. The pulse shapers rectify and amplify considerably these signals and clip them to provide pulses of desirable shape for the signal output circuits. The signal output circuits further amplify these pulses to provide series of positive voltage, square-wave pulses of proper magnitude for operating the remainder of the system shown in FIGS. 5 through 9. As shown in FIG. 4, each signal output circuit SO1 through SO12 is provided with four output conductors for supplying timing signal pulses to a plurality of points in the system hereinafter described.

Figure 5:
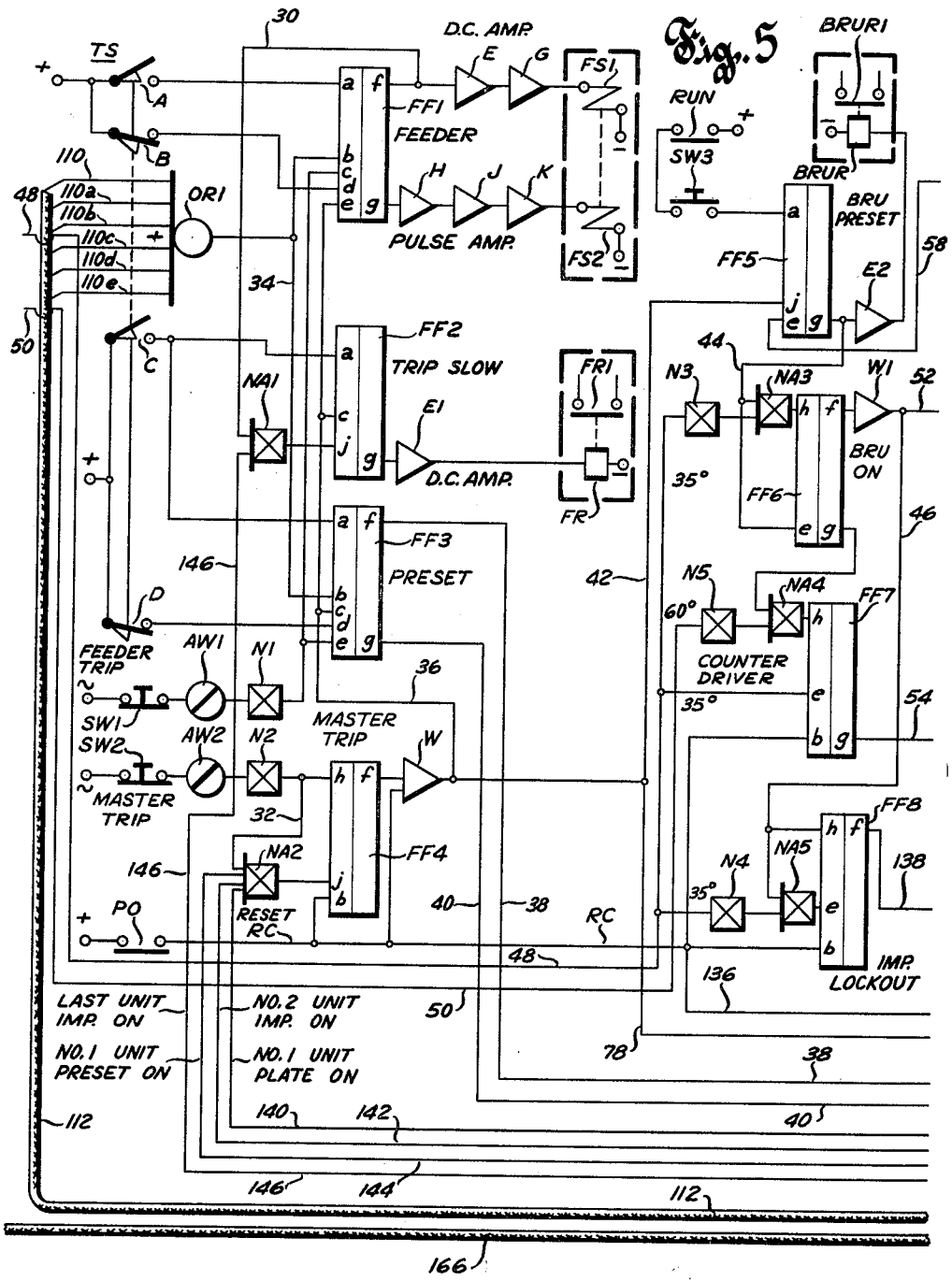

The feeder control and press acceleration control circuit in FIG. 5 is provided with a manually operable two-position trip-slow with TS. This trip-slow switch is provided with a first pair of normally open and normally closed contacts A and B which are actuated when the switch operating handle is moved from "off" position to a first operating position and a second pair of normally open and normally closed contacts C and D which are actuated when the switch handle is moved to a second operating position. A positive direct current source identified by a plus symbol is connectable through contact A of trip slow switch TS to a feeder "on" input terminal a of a feeder control flip-flop circuit FF1. Such direct current voltage source is also connected through contact B of trip slow switch TS to a fedder "off" input terminal d of flip-flop circuit FF1. A feeder "on" output terminal f of flip-flop circuit FF1 is connected through a preamplifier stage E and a power amplifier stage G of the direct current amplifying type and then through a "hold" solenoid FS1 to a negative D.C. source for maintaining the feeding of sheets from the feeder to the press. A feeder "off" output terminal g of flip-flop circuit FF1 is connected through a pulse amplifier stage H, a pulse power amplifier stage J and a pulse output amplifier stage K of the alternating current pulse amplifying type and through "operate" solenoid FS2 to a negative D.C. source for initiating the feeding of sheets from the feeder.

A positive direct current source is connectable through contact C of trip slow switch TS to an "on" input terminal a of a trip-slow flip-flop circuit FF2. Such direct current source is also connectable through contact C of trip slow switch TS to an "on" input terminal a of a preset flip-flop circuit FF3. Such direct current source is also connected through contact D of trip slow switch TS to an "off" input terminal d of preset flip-flop circuit FF3. The "on" output terminal f of feeder flip-flop circuit FF1 is also connected through a conductor 30 and through a NOT AND logic circuit NA1 to an "off" input terminal j of trip slow flip-flop circuit FF2.

An alternating current source is connected through a normally closed feeder trip manually operable switch SW1, a signal converter AW1 and a phase inverter or NOT logic circuit N1 to "off" input terminals c and e of flip-flop circuits FF1 and FF3, respectively. An alternating current source is connected through a normally closed master trip manually operable switch SW2, a signal converter AW2 and a NOT logic circuit N2 to an "on" input terminal h of a master trip flip-flop circuit FF4. The output terminal of logic circuit N2 is also connected through a conductor 32 to an input terminal of a NOT AND logic circuit NA2, and the output terminal of the latter is connected to an "off" input terminal j of flip-flop circuit FF4.

The "off" output terminal g of trip slow flop-flop circuit FF2 is connected through a direct current amplifier E1 and the operating coil of a "fast" relay or press accelerating relay FR to a negative direct current source. Relay FR is provided with a normally open contact FR1 which, when closed, will accelerate the press to a running speed in a manner well known in the art.

An OR logic circuit OR1 shown in the upper left-hand portion of FIG. 5 and having six input terminals is connected to an "off" input terminal b of feeder flip-flop circuit FF1 and also through conductor 34 to an "off" input terminal b of reset flip-flop circuit FF3. OR logic circuit OR1 is provided for the purpose of receiving loss of sheet signals at the feeder circuit whereby to stop the feeding of sheets in a manner hereinafter described.

In the lower left-hand portion of FIG. 5, a positive voltage source is connected through a normally open power-off contact PO and a reset conductor RC to an "off" input terminal b of master trip flip-flop circuit FF4 and also to a first input terminal of an amplifier W. The "on" output terminal f of master trip flip-flop circuit FF4 is connected directly to a second input terminal of amplifier W. The output terminal of amplifier W is connected through conductor 36 to "off" input terminals e, c and c of flip-flop circuits FF1, FF2 and FF3, respectively, and to other circuits hereinafter described. The pair of "on" and "off" output terminals f and g of preset flip-flop circuit FF3 are connected through conductors 38 and 40, respectively, to the sequence control circuits of press unit No. 1 in FIG. 6 hereinafter described.

Figure 6:
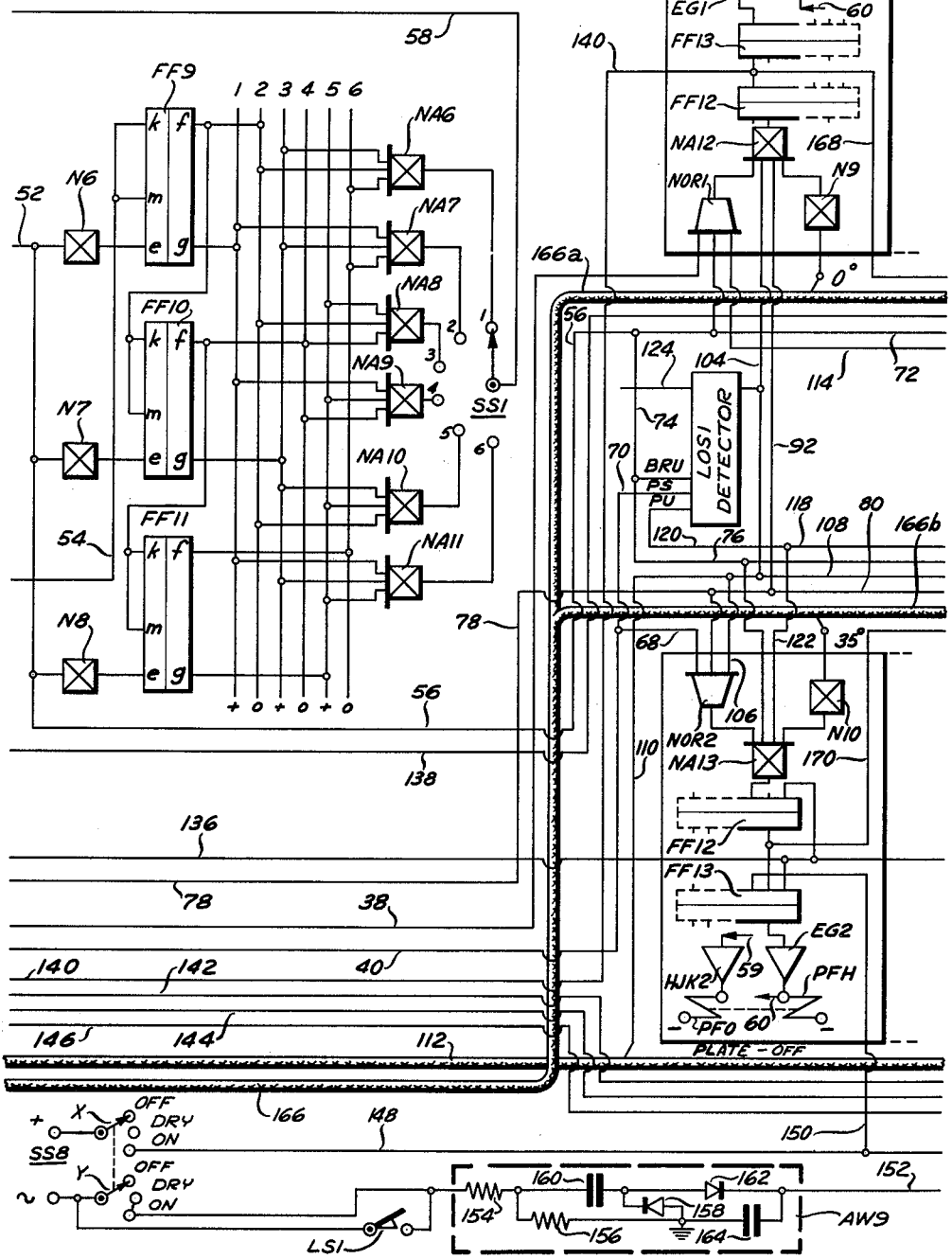

The right-hand portion of FIG. 5 and the left-hand portion of FIG. 6 show the blanket roll-up control circuits, that is, the controls whereby the press units are pre-inked before sheets of paper are run therethrough. As shown in the upper right-hand portion of FIG. 5, a positive direct current source is connectable through a normally open "run" contact RUN, and a normally open start switch SW3 to an "on" input terminal a of a blanket roll-up (BRU) preset flip-flop circuit FF5. The output terminal of the aforementioned amplifier W in the feeder control circuit in the lower portion of FIG. 5 is connected through a conductor 42 to an "off" input terminal j of flip-flop circuit FF5. The output terminal g of flip-flop circuit FF5 is connected through a direct current amplifier E2 and the operating coil of a blanket roll-up relay BRUR to a negative direct current voltage source. Relay BRUR is provided with a normally open contact BRUR1 for energizing an indicator lamp or the like to indicate that the blanket roll-up operation has been started. The output terminal g of flip-flop circuit FF5 is also connected through conductor 44 to a first input terminal of a NOT AND logic circuit NA3, the output terminal of which is connected to "on" input terminal h of a blanket roll-up "on" flip-flop circuit FF6. The output terminal g of flip-flop ciricuit FF5 is further connected through conductor 44 to the "off" input terminal e of flip-flop circuit FF6. The "off" output terminal g of flip-flop circuit FF6 is connected to a first input terminol of a NOT AND logic circuit NA4, the output terminal of which is connected to the "on" input terminal h of a counter-driver flip-flop circuit FF7. The "on" output terminal f of flip-flop circuit FF6 is connected through a direct current amplifier W1 and conductor 46 to the "on" input terminal h of an impression lockout flip-flop circuit FF8 and also to a first input terminal of a NOT AND logic circuit NA5 in the lower right-hand portion of FIG. 5.

The aforementioned positive direct current source shown in the lower left-hand portion of FIG. 5 is also connectable through contact PO and reset conductor RC to the "off" input terminals b of flip-flop circuits FF7 and FF8. The output terminal of timing signal circuit TSC2 in FIG. 4 is connected through a conductor 48 to the input terminals of NOT logic circuits N3 and N4 and to an "off" input terminal e of counter-driver flip-flop circuit FF7. The output terminals of NOT logic circuits N3 and N4 are connected to the other input terminals of NOT AND logic circuits NA3 and NA5, respectively. The output terminal of timing signal circuit TSC3 in FIG. 4 is connected through a conductor 50 to the input terminal of NOT logic circuit N5 in the right-hand portion of FIG. 5. The output terminal of logic circuit N5 is connected to the other input terminal of NOT AND logic circuit NA4. The "on" output terminal f of flip-flop circuit FF6 is also connected through the aforementioned direct current amplifier W1 and conductor 52 to the input terminals of NOT logic circuits N6, N7 and N8 in parallel, these NOT logic circuits being shown in the left-hand portion of FIG. 6. The output terminals of NOT logic circuits N6, N7 and N8 are connected to "off" input terminals e of blanket roll-up counter flip-flop circuits FF9, FF10 and FF11, respectively.

The "off" output terminal g of counter-driver flip-flop circuit FF7 in the right-hand portion of FIG. 5 is connected through conductor 54 to the common "on" and "off" input terminals k and m of flip-flop circuit FF9 in FIG. 6. The "on" output terminal f of blanket roll-up "on" flip-flop circuit FF6 is also connected through the aforementioned direct current amplifier W1 and conductor 52 and a conductor 56 to the unit sequence control circuits shown in FIGS. 6 through 9 as hereinafter described.

As will be apparent, flip-flop circuits FF9, FF10 and FF11 in FIG. 6 are binary counter flip-flops for counting the number of press revolutions during blanket roll-up. There are provided a set of six vertically-arranged multiple conductors or bus bars 1–6 affording connection of the counter flip-flop circuits through a plurality of NOT AND logic circuits NA6–NA11 to a selector switch. The "on" output terminal f of flip-flop circuit FF9 is connected to the second vertical conductor and also to the common "on" and "off" input terminals k and m of flip-flop circuit FF10. The "off" output terminal g of flip-flop circuit FF9 is connected to the first vertical conductor. The "on" output terminal f of flip-flop circuit FF10 is connected to the fourth vertical conductor and also to the common "on" and "off" input terminals k and m of flip-flop circuit FF11. The "off" output terminal g of flip-flop circuit FF10 is connected to the third vertical conductor. The "on" output terminal f of flip-flop circuit FF11 is connected to the sixth vertical conductor and the "off" output terminal g thereof is connected to the fifth vertical conductor.

A manually operable selector switch SS1 having six stationary contacts 1–6 and a movable brush contact is provided for manually selecting the number of press revolutions desired for blanket roll-up. The six vertical conductors are connected through NOT AND logic circuits NA6–NA11 to the stationary contacts of the selector switch in an arrangement such that the stationary contacts will be energized in sequence in accordance with the count. To this end, the second, third and sixth vertical conductors are connected to the three input terminals of NOT AND logic circuit NA6 whose output terminal is connected to the first stationary contact of the selector switch. The first, third and sixth vertical conductors are connected to the three input terminals of NOT AND logic circuit NA7 whose output terminal is connected to the second stationary contact of the selector switch. The second, fourth, and fifth vertical conductors are connected to the three input terminals of NOT AND logic circuit NA8 whose output terminal is connected to the third stationary contact of the selector switch. The first, fourth and fifth vertical conductors are connected to the three input terminals of NOT AND logic circuit NA9 whose output terminal is connected to the fourth stationary contact of the selector switch. The second, third and fifth vertical conductors are connected to the three input terminals of NOT AND logic circuit NA10 whose output terminal is connected to the fifth stationary contact of the selector switch. The first, third and fifth vertical conductors are connected to the three input terminals of NOT AND logic circuit NA11 whose output terminal is connected to the sixth stationary contact of the selector switch. The movable brush contact of selector switch SS1 is connected through a stop signal conductor 58 to the "off" input terminal e of blanket roll-up preset flip-flop circuit FF5 in FIG. 5. It will be apparent that the counter shown in FIG. 6 could be modified to count more than six revolutions by connecting additional input and output components to the vertical conductors in a similar manner.

Figure 7:
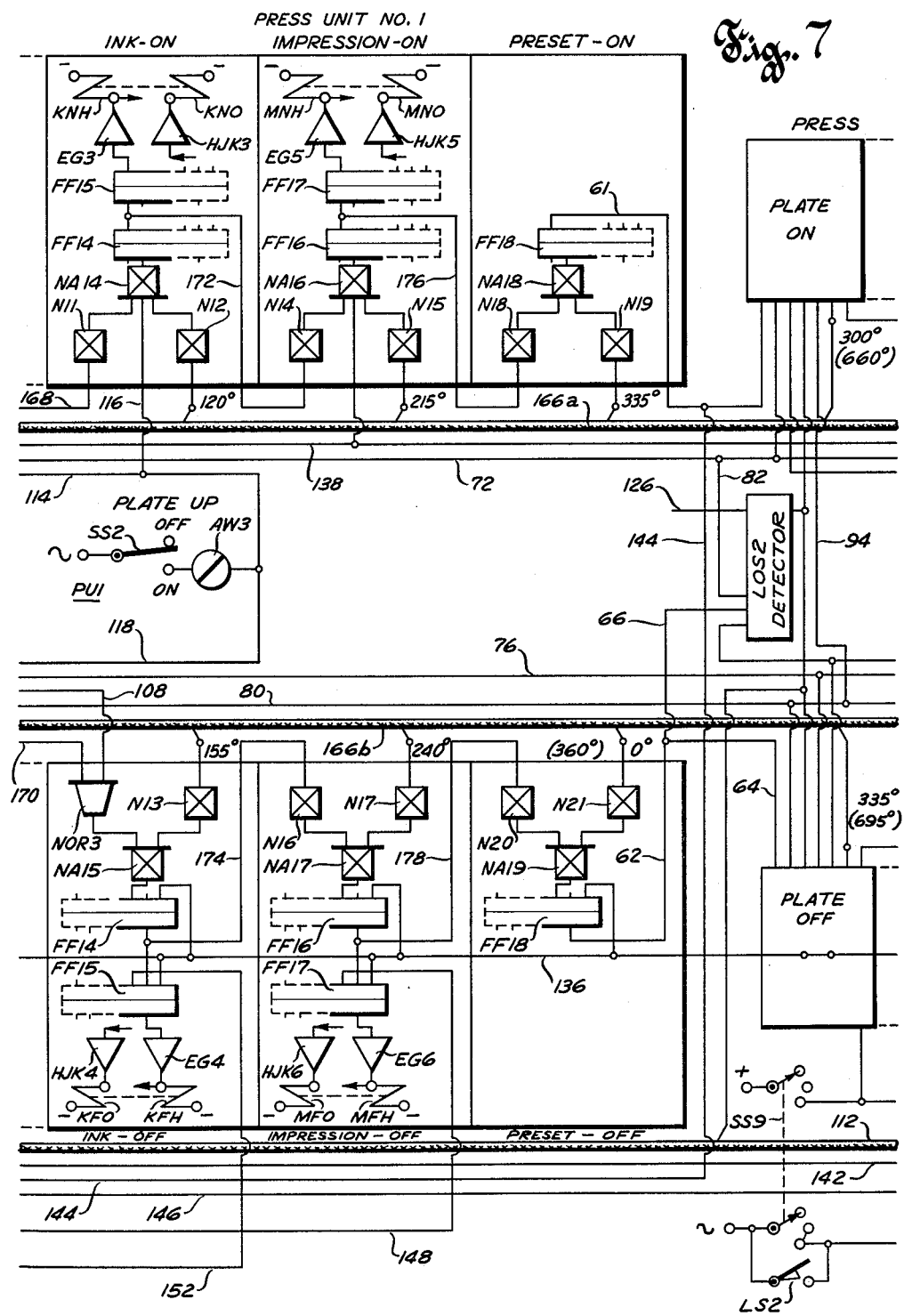
Figure 8:
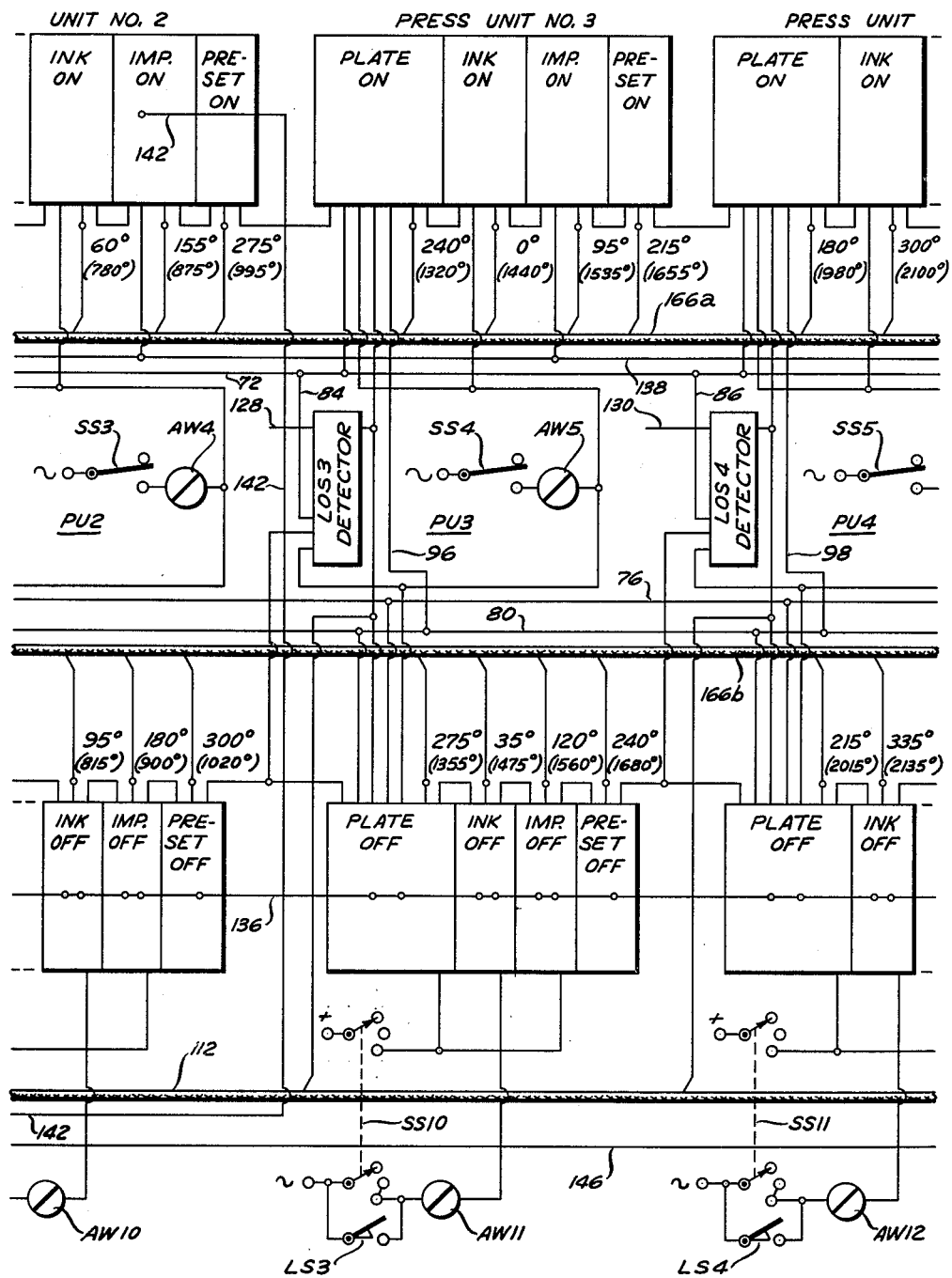
Figure 9:
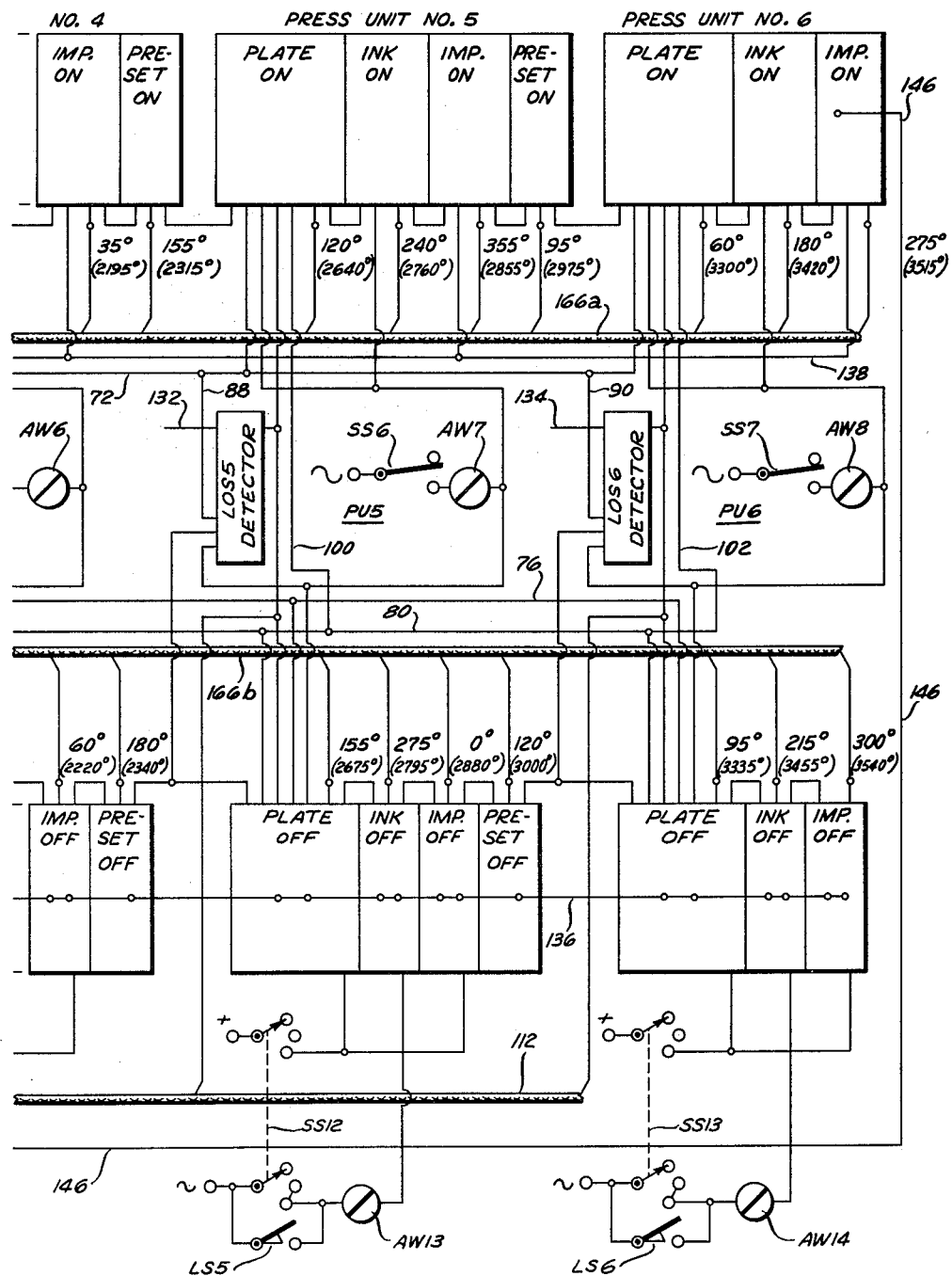

The unit sequence control circuits for controlling the six units of the press are shown in the right-hand portion of FIG. 6 and in FIGS. 7, 8 and 9. Press unit No. 1 is provided with a unit sequence control circuit comprising plate-on, ink-on, impression-on and preset-on circuits shown in the upper portion of FIG. 6 and FIG. 7 and plate-off, ink-off, impression-off and preset-off circuits shown at the lower portion of FIGS. 6 and 7. Press units 2 through 6 are provided with similar unit sequence control circuits except that press unit No. 6 does not require a preset-on and a preset-off control circuit because it is the last unit in the press. The unit sequence control circuits of press units 2 through 6 are shown in block diagram form in FIGS. 7 through 9 to avoid unnecessary duplication. While the preset-on and preset-off control circuits are shown in connection with press units Nos. 1–5 for convenience because they are controlled thereby, these control circuits are actually provided for press units Nos. 2–6 to control presetting of the plate-on control circuits of the latter, the plate-on circuit of press unit No. 1 being preset from the feeder circuit in FIG. 5.

The plate-on circuit of press unit No. 1 shown in the upper right-hand portion of FIG. 6 is provided with a NOR logic circuit NOR1 and a NOT logic circuit N9 having their output terminals connected to two input terminals of a NOT AND logic circuit NA12. The output terminal of NOT AND logic circuit NA12 is connected through the "on" sides of a pair of flip-flop circuits FF12 and FF13 and then through a set of amplifiers EG1 and a plate-on "hold" solenoid PNH to a negative direct current source. The plate-off control circuit for press unit No. 1 shown in the lower right-hand portion of FIG. 6 is provided with a NOR logic circuit NOR2 and a NOT logic circuit N10 having their output terminals connected to two input terminals of a NOT AND logic circuit NA13. The output terminal of NOT AND logic circuit NA13 is connected through the "off" sides of the same flip-flop circuits FF12 and FF13 and then through a set of amplifiers EG2 and plate-off "hold" solenoid PFH to a negative direct current source. The output of amplifier EG1 in the plate-on control circuit at the upper portion of FIG. 6 is connected through conductor 59 to the input of a set of pulse amplifiers HJK2 in the plate-off control circuit at the lower portion of FIG. 6 to control plate-off "operate" solenoid PFO. Similarly, the output of amplifier EG2 in the plate-off control circuit at the lower portion of FIG. 6 is connected through conductor 60 to the input of a set of pulse amplifiers HJK1 in the plate-on control circuit at the upper portion of FIG. 6 to control plate-on "operate" solenoid PNO. The manner in which flip-flop circuits FF12 and FF13 are connected to the logic circuits, amplifiers and to one another will be more fully described in connection with FIGS. 18 and 19.

As shown in the upper left-hand portion of FIG. 7, the ink-on control circuit is provided with a pair of NOT logic circuits N11 and N12 having their output terminals connected to two input terminals of a NOT AND logic circuit NA14. The output terminal of NOT AND logic circuit NA14 is connected through the "on" sides of a pair of flip-flop circuits FF14 and FF15 and then through a set of amplifiers EG3 and an ink-on hold solenoid KNH to a negative direct current source. As shown in the lower left hand portion of FIG. 7, the ink-off control circuit is provided with a NOR logic circuit NOR3 and a NOT logic circuit N13 having their output terminals connected to two input terminals of NOT AND logic circuit NA15. The output terminal of NOT AND logic circuits NA15 is connected through the "off" sides of the same flip-flop circuits FF14 and FF15 and then through a set of amplifiers AG4 and ink-off hold solenoid KFH to a negative direct current source. Pulse amplifiers HJK3 and HJK4 in the ink-on and ink-off control circuits for operating ink "on" "off" operate solenoids KNO and KFO, respectively, are cross connected to the outputs of ink "off" and "on" hold solenoid amplifiers EG4 and EG3 as described in connection with the plate-on and plate-off control circuits so that when a "hold" amplifier is turned off, a negative-going pulse is obtained for operating the opposite "operate" amplifier as hereinafter more fully described.

The impression-on control circuit in the upper portion of FIG. 7 is provided with a pair of NOT logic circuits N14 and N15 having their output terminals connected to two input terminals of a NOT AND logic circuit NA16. The output terminal of NOT AND logic circuit NA16 is connected through the "ON" sides of a pair of flip-flop circuits FF16 and FF17 and then through a set of amplifiers EG5 and impression-on hold solenoid MNH to a negative direct current source. The impression-off control circuit shown in the lower portion of FIG. 7 is provided with a pair of NOT logic circuits N16 and N17 having their output terminals connected to two input terminals of a NOT AND logic circuit NA17. The output terminal of NOT AND logic circuit NA17 is connected through the "off" sides of the same flip-flop circuits FF16 and FF17 and then through a set of amplifiers EG6 and impression-off hold solenoid MFH to a negative direct current source. Pulse amplifiers HJK5 and HJK6 and operate solenoids MNO and MFO are cross connected to the hold amplifiers as hereinbefore described.

The preset-on control circuit shown in the upper portion of FIG. 7 is provided with a pair of NOT logic circuits N18 and N19 having their output terminals connected to two input terminals of a NOT AND logic circuit NA18. The output terminal of NOT AND logic cuit NA18 is connected through the "on" side of flip-flop circuit FF18 and then through a conductor 61 to a NOR logic circuit in th eplate-on control circuit of press unit NO. 2 similar to NOR logic circuit NOR1 in the plate-on circuit of press unit No. 1 shown in the upper right-hand portion of FIG. 6. The preset-off circuit shown in the lower portion of FIG. 7 is provided with a pair of NOT logic circuits N20 and N21 having their output terminals connected to two input terminals of a NOT AND logic circuit NA19. The output terminal of NOT AND logic circuit NA19 is connected through the "off" side of the same flip-flop circuit FF18 and then through conductors 62 and 64 to a NOR logic circuit in the plate-off control circuit of press unit No. 2 similar to NOR logic circuit NOR2 in the plate-off control circuit of press unit No. 1 shown in FIG. 6. The output terminal of flip-flop circuit FF18 in the preset-off circuit is also connected through conductors 62 and 66 to a preset or reset input terminal of a loss of sheet detector circuit LOS2 for resetting the latter as hereinafter more fully described.

The "on" output terminal $f$ of preset flip-flop circuit FF3 in the feeder control circuit of FIG. 5 is connected through conductor 38 to the left-hand input terminal of NOR circuit NOR1 in the first press unit plate-on control circuit. The "off" output terminal $g$ of preset flip-flop circuit FF3 in the feeder control circuit of FIG. 5 is connected through conductors 40 and 68 to the left-hand input terminal of NOR circuit NOR2 in the plate-off control circuit of press unit No. 1, and is also connected through conductors 40 and 70 to a preset or reset input terminal PS of a loss of sheet detector circuit LOS1 in the right-hand mid-portion of FIG. 6 for resetting the latter. The "on" output terminal F of blanket roll-up on flip-flop circuit FF6 in the right-hand portion of FIG. 5 is connected through amplifier W1 and conductors 52 and 56 to the middle input terminal of NOR circuit NOR1 in the plate-on circuit of press unit No. 1 and also through conductor 72 to similar points in the plate-on control circuits of press units 2 through 6. This conductor 56 is also connected through a conductor 74 to a blanket roll-up input terminal BRU to lock out loss of sheet detector circuit LOS1. This conductor 74 is further connected through a conductor 76 to an input terminal of NOT AND circuit NA13 in the plate-off control circuit for press unit No. 1 and to similar points in the plate-off control circuits of press units Nos. 2 through 6. The "on" output terminal $f$ of master trip flip-flop circuit FF4 in FIG. 5 is connected through amplifier W and through a conductor 78 to the middle input terminal of NOR circuit NOR2 in the plate-off control circuit of press unit No. 1, and through conductor 80 to similar points in the plate-off control circuits of press units 2 through 6.

The aforementioned conductor 56 which is connected to the middle input terminal of NOR circuit NOR1 and through conductor 72 to similar points in the other unit sequence control circuits and through conductor 74 to loss of sheet circuit LOS1 is also connected through conductors 82, 84, 86, 88 and 90 to similar points in loss of sheet circuits LOS2 through LOS6 as shown in FIGS. 7, 8 and 9 to prevent operation of the latter during preinking. The aforementioned conductor 80 is also connected through conductor 92 to an input terminal of NOT AND circuit NA12 in the plate-on control circuit of press unit No. 1 and through conductors 94, 96, 98, 100 and 102 to similar points in the plate-on control circuits of press units 2 through 6. The output terminal of loss of sheet detector circuit LOS1 is connected through a conductor 104 to an input terminal of NOT AND circuit NA12 in the plate-on control circuit of press unit No. 1. This detector output terminal is also connected through a conductor 106 to the right-hand input terminal of NOR circuit NOR2 in the plate-off control circuit of press unit No. 1, and through another conductor 108 to the right-hand input terminal of NOR circuit NOR3 in the ink-off control circuit of press unit No. 1. This detector output terminal is further connected through a conductor 110 extending through a cable 112 to a first input terminal of OR circuit OR1 in the upper left-hand portion of FIG. 5, whereby to transmit a stop signal when a loss of sheet condition is detected.

Loss of sheet detector circuits LOS1–LOS6 are similar to one another and are provided for the purpose of controlling the feeder control circuit and the unit sequence control circuits whenever a misplaced or "lost" condition is detected at any one or more of a plurality of points in the press. For the purposes of this invention, it is sufficient to observe that these loss of sheet detector circuits normally have ground potential connected to their output terminals and provide positive voltage output signals in response to detection of lost sheet conditions. For a detailed illustration and description of these loss of sheet detector circuits, reference may be had to D. W. Fath et al. copending application Serial No. 324,433, filed November 18, 1963, and assigned to the assignee of this invention.

The unit sequence control circuit for each press unit is provided with a plate-up control circuit such as plate-up control circuits PU1 through PU6 shown in the mid-portions of FIGS. 7, 8 and 9. After a printing plate has been mounted on the plate cylinder of a press unit, the plate-up circuit associated with such press unit is utilized to enable pressure to be applied between the blanket cylinder and the plate cylinder whereby to smoothly and securely fix the printing plate to the contour of the plate cylinder. As shown in FIG. 7, plate-up circuit PU1 comprises an alternating voltage source connectable through a selector switch SS2 to the input terminal of a signal converter AW3. The output terminal of signal converter AW3 is connected through a conductor 114 to the right-hand input terminal of NOR circuit NOR1 in the plate-on control circuit of press unit No. 1 to apply a preset signal to enable performance of the plate-on function. The output terminal of signal converter circuit AW3 is also connected through a conductor 116 to an input terminal of NOT AND circuit NA14 in the ink-on control circuit of press unit No. 1 to lock out the ink-on function. The output terminal of signal converter circuit AW3 is also connected through conductors 118 and 120 to an "off" input terminal PU of loss of sheet circuit LOS1 in FIG. 6 to lock out circuit LOS1, and through conductors 118 and 122 to an input terminal of NOT AND logic circuit NA13 in the plate-off control circuit of press unit No. 1 to lock out the plate-off function. Loss of sheet detector circuit LOS1 is provided with an input conductor 124 for applying loss of sheet operating signals thereto, and loss of sheet circuits LOS2 through LOS6 are provided with similar input signal conductors 126, 128, 130, 132, and 134. Plate-up control circuits PU2–PU6, are provided with similar selector switches SS3–SS7 and signal converters AW4–8 and are connected to the respective control circuits of press units Nos. 2–6 in a similar manner.

The aforementioned reset conductor RC in the lower portion of FIG. 5 is connected through a conductor 136 for applying resetting signals to the plate-off, ink-off, impression-off and preset-off control circuits of the press units. To this end, conductor 136 extends in the right-hand direction along the lower portions of FIGS. 6–9 and is connected to "off" input terminals of flip-flop circuits FF12 and FF13 in the plate-off control circuit, flip-flop circuits FF14 and FF15 in the ink-off control circuit, flip-flop circuits FF16 and FF17 in the impression-off control circuit and flip-flop circuit FF18 in the preset-off control circuit of press unit No. 1 as shown in FIGS. 6 and 7. Conductor 136 is connected in a similar manner to corresponding flip-flop circuits for press units Nos. 2 through 6.

When the blanket roll-up circuit of FIGS. 5 and 6 is operated, the plate-on and ink-on solenoids are operated in proper order but it is necessary to prevent operation of the impression-on solenoids to avoid smearing of ink on the impression cylinders since sheets are not fed into the press at this time. To this end, "on" output terminal $f$ of impression lockout flip-flop circuit FF8 in the lower right-hand portion of FIG. 5 is connected through a conductor 138 to an input terminal of NOT AND logic circuit NA16 in the impression-on control circuit of press unit No. 1 and to corresponding points in the control circuits of press units Nos. 2–6.

NOT AND logic circuit NA2 in the lower left-hand portion of FIG. 5 is provided with four input terminals for resetting the master trip flip-flop circuit under certain conditions as hereinafter described in connection with description of operation of the system. A first one of these input terminals is connected through the aforementioned conductor 32 to the output terminal of NOT logic circuit N2 in the master trip control circuit. A second one of these input terminals is connected through a conductor 140 to the "on" output terminal of flip-flop circuit FF12 in the plate-on control circuit of press unit No. 1 in FIG. 6. A third one of these input terminals is connected through a conductor 142 to the "on" output terminal of the first flip-flop circuit in the impression-on control circuit of press unit No. 2 in FIG. 8, similar to flip-flop circuit FF16 in press unit No. 1. The fourth one of these input terminals is connected through conductors 144 and 61 to the "on" output terminal of flip-flop circuit FF18 in the preset-on control circuit of press unit No. 1 in FIG. 7.

NOT AND logic circuit NA1 in the left-hand portion of FIG. 5 is provided with two input terminals for decelerating the press when the last unit is off impression as hereinafter described. The upper input terminal thereof is connected through the aforementioned conductor 30 to the "on" output terminal of feeder flip-flop circuit FF1. The lower input terminal thereof is connected through a conductor 146 to the "on" output terminal of the first flip-flop circuit in the impression-on control circuit of the last press unit, that is, press unit No. 6 in FIG. 9. The flip-flop circuit to which conductor 146 is connected is similar to flip-flop circuit FF16 in the upper portion of FIG. 7.

Referring to the lower portion of FIG. 6, there is shown a manual control for controlling press unit No. 1. This manual control comprises a selector switch SS8 having two levels X and Y, each level having a movable brush contact adjustable to successively engage three stationary contacts marked off, dry and on. The movable contact of level X is connected to a source of positive unidirectional voltage and the associated off and dry stationary contacts are left disconnected. The "on" stationary contact of level X is connected through conductors 148 and 150 to an "off" input terminal of flip-flop circuit FF13 in the plate-off control circuit of press unit No. 1. Such "on" stationary contact is also connected through conductor 148 to an "off" input terminal of flip-flop circuit FF17 in the impression-off control circuit of press unit No. 1. The "off" stationary contact of level Y is left disconnected. The movable contact of level Y is connected to a source of alternating voltage and the "dry" and "on" stationary contacts are connected to one another and to the input terminal of a signal converter AW9. An inker clutch limit switch LS1 which is open as shown when the clutch is engaged and which closes when the clutch is disengaged is connected across selector switch level Y. Limit switch LS1 is a safety device which operates the ink-off control circuit when the inker clutch is disengaged to prevent the ink rolls from being driven backwards by the plate cylinder. The output terminal of signal converter AW9 is connected through a conductor 152 to an "off" input terminal of flip-flop circuit FF15 in the ink-off control circuit of press unit No. 1.

Signal converter AW9 in the lower portion of FIG. 6 comprises a voltage divider and a combined voltage doubler and rectifier for providing unidirectional output voltage from the alternating voltage source. The voltage divider comprises a pair of resistors 154 and 156 connected in series from the input terminal to ground. This ground is connected through a unidirectional diode 158 in its forward direction and a capacitor 160 to the junction of resistors 154 and 156. The junction of diode 158 and capacitor 160 is connected through a unidirectional diode 162 in its forward direction to the output terminal and the latter is connected through a capacitor 164 to ground. As shown in the lower portions of FIGS. 7, 8 and 9, the control circuits for press units Nos. 2–6 are provided with similar selector switches SS9–SS13 and signal converters AW10–AW14, respectively, connected in a similar manner for manual control of these press units.

Figure 23:
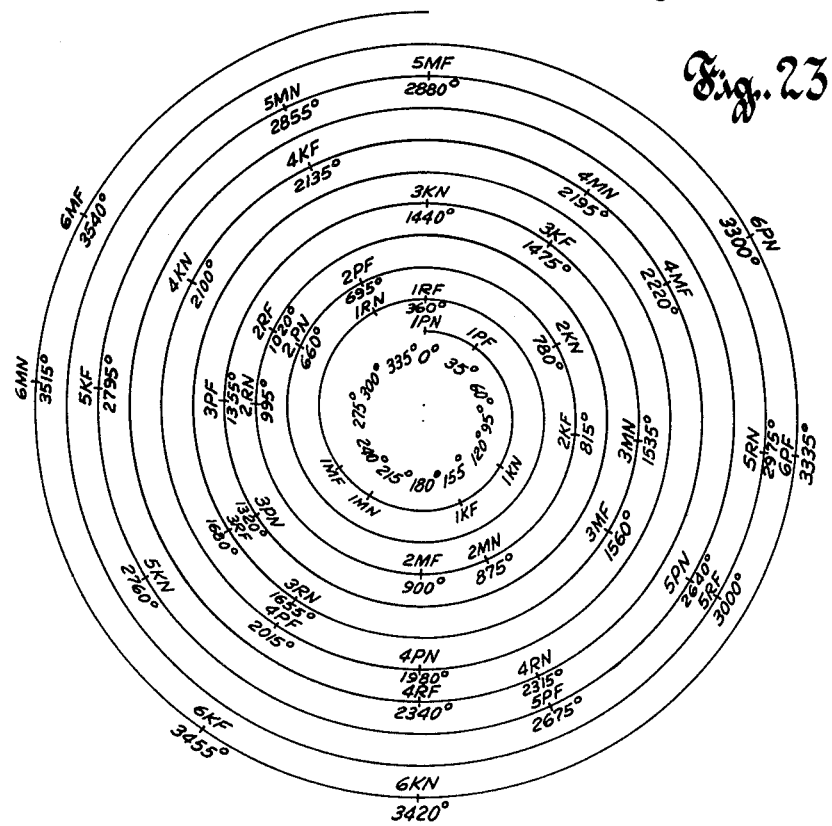
FIG. 23 graphically depicts timing cycle operating characteristics of the invention.

Referring to FIG. 4, it will be seen that each timing signal circuit TSC1–TSC12 has four conductors leaving its output terminal. The manner in which these conductors are connected to the unit sequence control circuits of press units Nos. 1 through 6 is graphically depicted in the timing diagram of FIG. 23. In FIG. 23, reference characters which are indicative of the connections have been employed. That is, these reference characters have prefix numerals indicative of the press unit and letter characters indicative of the specific connections. PN and PF indicate plate-on and plate-off, respectively, KN and KF indicate ink-on and ink-off, respectively. MN and MF indicate impression-on and impression-off, respectively. And RN and RF indicate preset-on and preset-off, respectively. Thus, 1PN indicates press unit No. 1 plate-on, 2KN indicates press unit No. 2 ink-on, 3MF indicates press unit No. 3 impression-off, 4RF indicates press unit No. 4 preset-off, etc.

Referring to FIG. 23, it will be apparent that zero degree timing signals are applied to press unit No. 1 plate-on (1PN) and preset-off (1RF), press unit No. 3 ink-on (3KN) and press unit No. 5 impression-off (5MF) control circuits. These zero degree timing signals are applied from timing signal circuit TSC1 in FIG. 4 through two output conductors in cable 166 and its first branch 166a to NOT logic circuit N9 in the plate-on control circuit for press unit No. 1 in FIG. 6, and to a similar NOT logic circuit in the ink-on control circuit of press unit No. 3 in FIG. 8. The other two output conductors of circuit TSC1 extend through cable 166 and its second branch 166b to NOT logic circuit N21 in the preset-off control circuit of press unit No. 1 in FIG. 7 and to a similar NOT logic circuit in the impression-off control circuit in press unit No. 5 in FIG. 9.

As shown in FIG. 4, three output conductors from each of timing signal circuits TSC2 and TSC3 enter cable 166 for applying 35 and 60 degree timing signals to three points, respectively, in the unit sequence control circuits. These three timing signals are also indicated radially at the 35 and 60 degree positions in FIG. 23. The fourth output conductors 48 and 50 of circuits TSC2 and TSC3 in FIG. 4 apply timing signals to the blanket roll-up control circuit in FIG. 5. The remaining timing signal circuits TSC4–TSC12 each have four output conductors entering cable 166 for applying timing signals to the unit sequence control circuits in FIGS. 6–9 as shown in the timing diagram of FIG. 23. The timing signal circuits are provided with degree markings at their output terminals in FIG. 4 and the unit sequence control circuits in FIGS. 6–9 are provided with like degree markings to show where the conductors extending through cable 166 and its branches 166a and 166b are connected.

The circuit details of master oscillator MO and timing signal circuit TSC1 are shown in FIG. 10. The other timing signal circuits of FIG. 4 are similar to circuit TSC1 except that the detector bridges thereof are connected to different electromagnets of pulse generator PG as shown in FIG. 4.

As shown in FIG. 10, master oscillator MO is of the resistance-capacitance feedback or phase shift type. Oscillator MO comprises a transistor T1 of the P-N-P conductivity type having its emitter connected through the resistor of a level control potentiometer POT and a resistor R1 to ground potential, there being a capacitor C1 connected from the movable tap of potentiometer POT to ground at the other side of resistor R1. Potentiometer POT is provided to afford negative feedback adjustments to afford stable operation and a sinusoidal output. The collector of transistor T1 is connected through a resistor R2 to a source of negative direct current voltage DC1.

The oscillator is provided with an emitter follower output circuit to reduce loading on the oscillator and for impedance matching to the three stages of RC coupling hereinafter described. The emitter follower circuit comprises a transistor T2 of the P-N-P conductivity type having its collector connected to negative source DC1. The base of transistor T2 is connected through a current limiting resistor R3 to the collector of transistor T1. The emitter of transistor T2 is connected through a load resistor R4 to ground potential. The emitter of transistor T2 is also connected to supply timing signal circuit TSC1 as shown in FIG. 10, and is further connected to supply the other eleven timing signal circuits TSC2 through TSC12 as shown by the circuit multiples in FIG. 10.

The phase shift circuit comprises three capacitors C2, C3 and C4 and three resistors R5, R6 and R7 for shifting the phase of the output voltage of transistor T2 in 60 degree steps for a total phase shift of 180 degrees and applying this phase shifted voltage as positive feedback, causing transistor T1 to generate an alternating current signal. The emitter of transistor T2 is connected through capacitor C2 and resistor R5 to ground potential. The junction of capacitor C2 and resistor R5 is connected through capacitor C3 and resistor R6 to ground potential, and the junction of capacitor C3 and resistor R6 is connected through capacitor C4 and resistor R7 to ground potential. The junction of capacitor C4 and resistor R7 is connected through a coupling capacitor C5 to the base of transistor T1.

Since the output voltage of transistor T1 is 180 degrees out of phase with the input voltage, the RC circuit shifts the phase another 180 degrees to afford positive feedback to the base of transistor T1. The output voltage wave form of the oscillator is sinusoidal with very little distortion due to the addition of negative feedback controlled by an adjustable level control potentiometer POT.

The oscillator is also provided with a circuit for setting its operating point. This circuit comprises a resistor R8 connected between the base of transistor T1 and ground potential and a resistor R9 and a rheostat RH1 connected in series between the base of transistor T1 and negative source DC1. Adjustment of rheostat RH1 provides for setting of the oscillator to afford optimum output and to adjust for transistor parameter variations.

Bridge driver circuit BD1 comprises a transistor T3 of the P-N-P conductivity type. The output of the oscillator is connected through a resistor R10 to the base of transistor T3. The collector of transistor T3 is connected to a negative voltage source DC2, and its emitter is connected through a resistor R11 to ground potential. Since the master oscillator supplies a plurality of timing signal circuits, it is desirable that such timing signal circuits have high input impedances. However, the detector bridges in the timing signal circuits such as detector bridge DB1 in FIG. 10, preferably require low input impedances. To satisfy these requirements, a bridge driver BD1 of the emitter follower type is interposed between the master oscillator and the detector bridge, the output of bridge driver BD1 being taken from the emitter of transistor T3.

Detector bridge circuit DB1 comprises a Maxwell type bridge having a pair of input terminals I1 and I2 and a pair of output terminal O1 and O2. The output of bridge driver BD1 is connected through a coupling capacitor C6 to input terminal I1 and input terminal I2 is connected to ground. Input terminal I1 is connected through a resistor R12 to output terminal O1 and is connected through a capacitor C7 and a rheostat RH2 in parallel to output terminal O2. Input terminal I2 is connected through a resistor R13 and a rheostat RH3 in series to output terminal O2 and is also connected through the coil of electromagnet 16 to output terminal O1. Output terminals O1 and O2 are connected across the primary winding of an isolating transformer TR. The secondary winding of transformer TR is connected through conductors 170 and 172 to pulse shaper circuit PS1.

Pulse shaper circuit PS1 comprises a transistor T4 of the N-P-N conductivity type. A positive voltage source DC3 is connected through resistors R14 and R15 to ground potential, the junction of these resistors being connected to the base of transistor T4 and being also connected through a coupling capacitor C8 to input conductor 172. Positive source DC3 is also connected through a resistor R16 and a test terminal TT4 to the collector of transistor T4. Terminal TT4 is provided for connection of a meter to facilitate adjustment of the detector bridge. The emitter of transistor T4 is connected to input conductor 170 and to ground potential. The output from the pulse shaper is taken from the collector of transistor T4 and applied to signal output circuit SO1.

Signal output circuit SO1 comprises a transistor T5 of the N-P-N conductivity type having its collector connected to a positive voltage source DC4, and having its emitter connected through a resistor R17 to ground potential. The output of pulse shaper circuit PS1 is connected through a current limiting resistor R18 to the base of transistor T5 and the base of transistor T5 is connected through a resistor R19 to a negative voltage source DC5. The output from signal output circuit SO1 is taken from the emitter of transistor T5 relative to ground potential.

The operation of the system shown in FIGS. 4 through 9 will now be described. Let it be assumed that the press is started to run at a slow speed in well known manner. As a result, contact RUN in FIG. 5 is closed and the press cylinders rotate at a slow speed and advance cylinder AC in FIG. 1 drives pulse generator PG in synchronism therewith. The press driving mechanism also drives sheet feeder FE in synchronism therewith so that when the feeding of sheets is started, they will be fed into the press at the proper speed, that is, one sheet will be registered and fed into the press for each revolution of feed cylinder FC.

After the press is running at a slow speed, the feeding of sheets is started. This is done by turning trip-slow switch TS in FIG. 5 to its first position to close contact A and to open contact B thereof. Loss of sheet detector circuits LOS1–LOS6 may also be turned on at this time. Contact B disconnects positive voltage from "off" input terminal d of feeder flip-flop circuit FF1. Contact A connects positive voltage to "on" input terminal a of flip-flop circuit FF1. Such application of positive voltage to the "on" input terminal of flip-flop circuit FF1 causes "on" output terminal f to supply a positive voltage, that is, to shift from ground to positive voltage. Also "off" output terminal g shifts from positive voltage to ground.

Flip-flop circuit FF1 may be similar to that shown in FIG. 11. The flip-flop circuit shown in FIG. 11 is provided with a pair of transistors T6 and T7 of the N-P-N conductivity type. A positive voltage source DC6 is connected through resistors R20 and R21 to the respective collectors of transistors T6 and T7 and the emitters thereof are connected to ground potential. The base of transistor T6 is connected through a resistor R22 to a negative voltage source DC7 and the base of transistor T7 is connected through a resistor R23 to such negative source. The collector of transistor T6 is connected through a resistor R24 to the base of transistor T7 and the collector of transistor T7 is connected through a resistor R25 to the base of transistor T6. The "on" input terminal a is connected through a coupling capacitor C9 and a resistor R26 to the base of transistor T6. Ground is connected through a unidirectional diode D1 in its forward direction to the junction between capacitor C9 and resistor R26. The "off" input terminals b, c, d and e are connected through respective resistors R27, R28, R29 and R30 to the base of transistor T7. The "on" output terminal f is connected to the collector of transistor T7 and the "off" output terminal g is connected to the collector of transistor T6.

Let it be assumed that transistor T7 normally conducts and transistor T6 does not conduct. Current flows from positive source DC6 through resistors R20, R24 and R23 to negative source DC7. Resistor R23 is larger than the sum of resistors R20 and R24 so that a positive voltage is applied to the base of transistor T7 to maintain it conducting. Conduction of transistor T7 causes the collector thereof to go nearly to ground potential whereby a negative voltage is applied from the junction of resistors R25 and R22 to the base of transistor T6 to maintain it nonconducting.

When a positive voltage is applied to "on" input terminal a, the circuit flips to a condition wherein transistor T6 conducts and transistor T7 does not conduct. Such positive voltage is applied as a pulse through capacitor C9 and resistor R26 to the base of transistor T6 to render the latter conducting. Since the collector of transistor T6 goes nearly to ground potential, a negative voltage is applied from the junction of resistors R24 and R23 to the base of transistor T7 to render it non-conducting. When the circuit is so flipped, "on" output terminal f shifts from ground to a positive voltage and "off" output terminal g shifts from a positive voltage to ground. Application of a positive voltage on any one of "off" input terminals b, c, d and e causes the circuit to flop back to its original condition.

Referring to FIG. 5, application of a positive voltage to "on" input terminal a of feeder flip-flop circuit FF1 causes a positive voltage to be applied from "on" output terminal f to amplifier E. The details of amplifier E are shown in FIG. 12. As shown therein, the amplifier input terminal is connected through a pair of series resistors R31 and R32 to a negative voltage source DC8. The junction of these resistors is connected to the base of a P-N-P transistor T8. The emitter is connected to ground and the collector is connected to the amplifier output terminal and also through a resistor R33 to negative source DC8.

Transistor T8 normally conducts when ground is connected to input resistor R31. Under this condition, the output of amplifier E is substantially ground potential. However, when flip-flop circuit FF1 applies positive voltage to amplifier E, transistor T8 is rendered non-conducting. As a result, the output of amplifier E is a negative voltage. Such shift from ground to negative voltage is applied to amplifier G in FIG. 5.

The details of amplifier G are also shown in FIG. 12. The input terminal is connected through a pair of series resistors R34 and R35 to a positive voltage source DC9. The junction of these resistors is connected to the base of a P-N-P transistor T9. The emitter is connected to ground and the collector is connected to output terminal OT and through a load to a negative voltage source DC10 of 48 volts or the like. A small surge suppressor capacitor C10 is connected across the load. An inductive discharge diode D2 is connected across the inductive load.

Normally when ground is applied from amplifier E to amplifier G, transistor T9 does not conduct because its base is slightly positive. However, when amplifier E applies negative voltage to amplifier G, transistor T9 is rendered conducting. Current flows from ground through the emitter and collector thereof and through the load to negative source DC10. Diode D2 allows induced current to flow after transistor T9 is rendered non-conducting.

Referring again to FIG. 5, application of a positive voltage to amplifiers E and G causes energization of "hold" solenoid FS1. When output terminal g of feeder flip-flop FF1 shifts from positive voltage to ground potential, the resulting negative-going pulse operates amplifiers H, J and K momentarily to energize "operate" solenoid FS2. The details of amplifier stages H, J and K will be hereinafter described in connection with FIG. 20. Operate solenoid FS2 upon being pulsed as aforesaid starts the feeding of sheets into the press. Hold solenoid FS1 thereafter maintains the feeding of sheets until it is de-energized.

Feeder flip-flop circuit FF1 also applies positive voltage through conductor 30 to the upper input terminal of NOT AND logic circuit NA1. As a result, ground is applied from the output terminal of circuit NA1 to "off" input terminal j of trip-slow flip-flop circuit FF2 to permit operation of the latter.

The details of a NOT AND logic circuit are shown in FIG. 13. This circuit has a plurality of input terminals connected through respective resistors R36, R37, R38 and R39 to the base of an N-P-N transistor T10 and through a resistor R40 to a negative voltage source DC11. The emitter is connected to ground and the collector is connected through a resistor R41 to a positive voltage source DC12 and is also connected to the output terminal. As will be apparent, the NOT AND circuit is an AND circuit with phase inversion which produces an output signal only when a control signal is applied to every input terminal. That is, the NOT AND circuit provides a positive output voltage only when no voltage or ground is connected to every input terminal. When a positive voltage is connected to at least one input terminal of the NOT AND circuit in FIG. 13, the base is rendered positive to cause transistor T10 to conduct. As a result, the output shifts from positive voltage to ground. When no voltage or ground potential is applied to all the input terminals, current flows through the input resistors R36, R37, R38 and R39 and then though resistor R40 to negative source DC11. The base of transistor T10 is rendered negative by the voltage drop in the input resistors to stop transistor T10 from conducting. As a result, the output shifts from ground potential to a positive voltage.

The NOT AND logic circuit NA1 in FIG. 5 is similar to that in FIG. 13 except that only two input terminals are connected. Application of a positive voltage through conductor 30 to the upper input terminal of circuit NA1 as aforesaid causes ground potential to be applied therefrom to "off" input terminal j of trip-slow flip-flop circuit FF2.

In FIG. 9, conductor 146 is connected to the "on" output terminal of a flip-flop circuit in the same manner as conductor 140 in FIG. 6 is shown connected to flip-flop circuit FF12. When the last press unit impression is "off," ground is applied to conductor 146. When such impression is "on," positive voltage is applied to conductor 146. Such positive voltage delays tripping of the press speed to a slow value after switch TS is restored until the last press unit impression is off as hereinafter described.

Preset flip-flop circuit FF3 in FIG. 5 is normally in its "off" condition and is so maintained by positive voltage connected through contact D of trip slow switch TS to its "off" input terminal d. Consequently, ground potential is connected from its output terminal f to conductor 38 and positive voltage is connected from its output terminal g to conductor 40.

Alternating voltage is normally connected through feeder trip switch SW1 to signal converter circuit AW1. This circuit AW1 is like signal converter circuit AW9 at the lower portion of FIG. 6 whereby it provides a positive unidirectional voltage to NOT logic circuit N1 when switch SW1 is closed.

The details of a NOT logic circuit are shown in FIG. 14. As shown therein, the input terminal is connected through a pair of series resistors R42 and R43 in series to a negative voltage source DC 13. The junction of these resistors is connected to the base of an N-P-N transistor T11. The emitter is connected to ground and the collector is connected to the output terminal and also through a resistor R44 to a positive voltage source DC14. It will be apparent that when positive voltage is applied to the input terminal, transistor T11 conducts. As a result, the output shifts from positive voltage to ground. When the input voltage is disconnected or ground potential is applied, the base goes negative to stop transistor T11 from conducting. As a result, the output shifts from ground to positive voltage. It will be apparent that the NOT circuit is a phase inverter logic switching device. All the NOT logic circuits N1 through N21, etc., in FIGS. 5–9 are similar to that in FIG. 14.

Referring to FIG. 5, it will be apparent that application of a positive voltage to NOT logic circuit N1 causes ground potential to be applied from the latter to "off" input terminals c and e of flip-flop circuits FF1 and FF3, respectively. Thus, when feeder trip switch SW1 is opened, NOT logic circuit N1 applies a positive voltage to restore feeder flip-flip circuit FF1 and preset flip-flop circuit FF3 to their "off" conditions thereby to stop feeding of sheets into the press. When switch SW1 is reclosed, feeding is resumed. Feeder trip switch SW1 is employed to trip the feeder when the conditions requiring it are not the most serious. When a more serious condition occurs, master trip switch SW2 is opened to not only stop the feeding of sheets but also to trip the speed of the press immediately to a slow value. For this purpose, an alternating voltage source is connected through master trip switch SW2 to signal converter AW2 which is like signal converter AW9 at the lower portion of FIG. 6. Application of a positive voltage from signal converter AW2 to NOT logic circuit N2 causes the latter to apply ground potential to "on" input terminal h of master trip flop-flop circuit FF4. Such ground potential is also applied through conductor 32 to NOT AND logic circuit NA2. If master trip switch SW2 is opened, NOT circuit N2 applies positive voltage to "on" input terminal h whereby positive voltage is applied from "on" output terminal f of master trip flip-flop circuit FF4 to amplifier W. As a result, amplifier W applies positive voltage through conductor 36 to restore flip-flop circuits FF1, FF2 and FF3 to their "off" conditions thereby to stop feeding of sheets and to trip the press to slow speed.

The details of amplifier W are shown in FIG. 15. As shown therein, two input terminals are connected through respective resistors R45 and R46 to the base of an N-P-N transistor T12 and such base is connected through a resistor R47 to a negative voltage source DC15. A positive voltage source DC16 is connected to the collector and the emitter of transistor T12 is connected to the output terminal and also through a resistor R48 to ground. It will be apparent that when ground or no input signal is applied to the input terminals, the base is negative and the transistor does not conduct. As a result, the output is substantially at ground potential, that is, no output signal is obtained. When a positive voltage is applied to one of the input terminals, transistor T12 conducts and a positive voltage proportional to the drop across resistor R48 appears at the output terminal. It will be seen that amplifier W is similar to signal output circuit SO1 in FIG. 10 except that it has two like inputs either one of which can operate the amplifier.

The press may be accelerated from trip-slow speed to printing speed and the press units at the same time are rendered operable by turning trip-slow switch TS to its second position causing closure of its contact C and opening of its contact D. Positive voltage is applied through contact C to "on" input terminal $a$ of trip-slow flip-flop circuit FF2. As a result, output terminal $g$ of flip-flop circuit FF2 switches from positive voltage to ground. This causes operation of amplifier E1 and energization of the operating coil of fast relay FR as hereinafter described in connection with FIGS. 16 and 12. Relay FR closes contact FR1 to accelerate the press.

The details of trip-slow flip-flop circuit FF2 are shown in FIG. 16. As shown therein, this flip-flop circuit is similar to that in FIG. 11 except for certain changes hereinafter described. Reference characters like those in FIG. 11 have been used in FIG. 16 for like elements. The flip-flop circuit in FIG. 16 has a second "on" input terminal $h$ connected through resistor R26 to the base of transistor T6. The "off" input terminals $c$ and $d$ and resistors R28 and R29 have been omitted whereas an "off" input terminal $j$ has been added and connected through a resistor R49 to the base of transistor T7. Ground is connected through a diode D3 to input terminal $j$. It will be apparent that application of positive voltage to input terminal $a$ causes transistor T6 to conduct and causes transistor T7 to become non-conducting. As a result, output terminal $g$ shifts from positive voltage to ground.

Amplifier E1 is like amplifier E shown in FIG. 12. Normally, positive voltage is applied thereto from flip-flop circuit FF2 so that transistor T8 does not conduct. Under such condition, the output of amplifier E1 is negative so that no voltage difference appears across the operating coil of relay FR in FIG. 5. When output terminal $g$ of flip-flop circuit FF2 shifts to ground, a voltage slightly negative is applied to the base of transistor T8, FIG. 12, of amplifier E1 to cause it to conduct. As a result, ground is connected to the operating coil of relay FR to energize the same and to accelerate the press.

Contact D of trip-slow switch TS in FIG. 5 disconnects positive voltage from "off" input terminal $d$ of preset flip-flop circuit FF3 and contact C also connects positive voltage to "on" input terminal $a$ thereof. Preset flip-flop circuit FF3 is like circuit FF1 shown in FIG. 11. Connection of positive voltage to input terminal $a$ causes output terminal $f$ of flip-flop circuit FF3 to shift from ground to positive voltage and output terminal $g$ shifts from positive voltage to ground. This positive voltage is applied through conductor 38 as a preset signal to NOR logic circuit NOR1 in the upper right-hand portion of FIG. 6. As a result, logic circuit NOR1 applies ground to NOT AND logic circuit NA12 as hereafter described.

The details of a NOR logic circuit are shown in FIG. 17. As shown therein, a plurality of input terminals are connected through respective resistors R50, R51 and R52 to the base of an N-P-N transistor T13 and the base is connected through a resistor R53 to a negative voltage source DC17. A positive voltage source DC18 is connected through a resistor R54 to the output terminal and to the collector and the emitter is connected to ground. It will be apparent that when no input signal or ground is connected to all the input terminals, transistor T13 does not conduct whereby positive voltage is applied to the output terminal. When positive voltage is applied to one or more input terminals, transistor T13 conducts and ground is applied to the output terminal. This NOR circuit is a phase-inverter like the NOT circuit of FIG. 14 but differs therefrom in that it has more than one input connection.

From the foregoing, it will be apparent that logic circuit NOR1 in FIG. 6 applies ground potential to one of the four input terminals of NOT AND logic circuit NA12. Circuit NA12 is like NOT AND logic circuit NA2 in FIG. 5 hereinbefore described and shown in FIG. 13. If positive voltage is being applied to any one of the inputs in FIG. 13, transistor T10 conducts to provide a ground potential output. It is only when all inputs are grounded or disconnected that transistor T10 stops conducting to provide a positive voltage output. Such condition occurs each time that a zero degree timing signal is applied to NOT logic circuit N9 as hereinafter described. When logic circuit NA12 is operated, it applies a positive voltage signal to operate flip-flop circuits FF12 and FF13 in sequence whereby to operate amplifiers EG1 and HJK1 and plate-on operate and hold solenoids PNO and PNH in press unit No. 1.

In FIG. 5, preset flip-flop circuit FF3 also applies ground potential through conductor 40 and then through conductor 68 to logic circuit NOR2 in the plate-off control circuit of press unit No. 1 and through conductor 70 to an "off" input terminal of loss of sheet detector circuit LOS1. This ground potential applied through conductor 68 prevents energization of the solenoids in the plate-off control circuit of press unit No. 1 and permits operation of loss of sheet circuit LOS1 in the event a lost sheet condition is detected. From the foregoing it will be apparent that just prior to operation of preset flip-flop circuit FF3, positive voltage was applied from terminal $g$ thereof through conductors 40 and 70 to circuit LOS1 to preset the loss of sheet circuit in the event it had theretofore being operated. Such positive voltage is applied to an "off" input terminal like the auxiliary preset connection disclosed in the aforementioned copending application. When loss of sheet circuit LOS1 is operated by a lost sheet signal, its output from an output flip-flop circuit shifts from ground to a positive voltage. When circuit LOS1 is preset as aforementioned, its output shifts from positive voltage to ground potential. This ground potential is applied through conductor 104 to NOT AND logic circuit NA12. This ground potential is also applied through conductor 106 to logic circuit NOR2 in the plate-off control circuit and through conductor 108 to logic circuit NOR3 in the ink-off control circuit and through conductor 110 and cable 112 to the upper input terminal of logic circuit OR1 in the upper left-hand portion of FIG. 5. It will be recalled from the foregoing description that the output of amplifier W in FIG. 5 is ground potential as long as master trip flip-flop circuit FF4 remains in its "off" condition and this ground is connected through conductors 78 and 92 to circuit NA12.

Since ground potential is being applied to the three left-hand input terminals of NOT AND logic circuit NA12 in FIG. 6 as hereinbefore described, application of a timing signal to NOT logic circuit N9 will cause it to apply ground potential to the fourth input terminal of logic circuit NA12 thereby to cause operation of the plate-on control solenoids of press unit No. 1.

The operation of one of the timing signal circuits shown in FIG. 4 will now be described in connection with the detailed showing thereof in FIG. 10. An alternating voltage is continuously applied from master oscillator MO to bridge driver circuit BD1. Because the oscillator supplies twelve timing signal circuits, bridge driver BD1 is provided with an emitter follower circuit to provide a high input impedance and to provide a low output impedance therefrom to detector bridge circuit DB1. The oscillator voltage is applied through current limiting resistor R10 to the base of transistor T3 to render the transistor conducting from ground through resistor R11 and the emitter and collector to negative voltage source DC2. The alternating input voltage causes a proportional output voltage to be applied from the emitter of transistor T3 through coupling capacitor C6 to input terminal I1 of the detector bridge circuit.

Detector bridge circuit DB1 is adjusted for minimum output at test point TP by adjusting course adjustment rheostat RH3 and fine or vernier adjustment rheostat RH2 when armature 14 of pulse generator PG is displaced from coil 16. Therefore, when armature 14 is near or in line with coil 16 as it passes thereby during rotation of the pulse generator, the bridge is unbalanced to cause current flow through the primary winding of transformer TR. As a result, an alternating voltage is applied from the secondary winding of the isolation transformer through coupling capacitor C8 across resistor R15 in pulse shaper circuit PS1.

Since the spurt of pulses of alternating voltage derived from bridge circuit DB1 is displaced from ground potential level, one function of pulse shaper circuit PS1 is to bring this signal or series of pulses back to ground potential level. Pulse shaper circuit PS1 also rectifies the bridge signal and amplifies it considerably and clips it to give it a desired shape. The output signal from the pulse shaper circuit comprises a series of substantially square wave positive pulses.

Transistor T4 in the pulse shaper circuit is normally biased on. For this purpose, current flows from positive voltage source DC3 through resistors R14 and R15 to ground. The voltage drop across resistor R15 due to such current flow renders the base positive relative to the emitter normally to maintain transistor T4 conducting whereby current flows from positive voltage source DC3 through resistor R16 and the collector and emitter to ground. While transistor T4 conducts, the impedance thereacross is substantially zero so that ground potential is applied from the collector thereof to signal output circuit or amplifier SO1. When an alternating voltage signal is applied from the detector bridge to the pulse shaper, such signal drives transistor T4 to cutoff in accordance with the alternating cycles. As a result, rectified and shaped positive voltage pulses are applied from the collector of transistor T4 through resistor R18 to the base of transistor T5 in signal output circuit SO1. Transistor T5 is normally biased to its non-conducting condition by negative voltage from the junction of resistors R18 and R19 when the output of the pulse shaper circuit is at ground potential. However, when the aforementioned series of shaped positive pulses is applied through resistor R18, transistor T5 is rendered conducting. Current flows from positive voltage source DC4 through the collector and emitter of transistor T5 and resistor R17 to ground. As will be apparent, timing signal output circuit SO1 is an emitter follower current amplifier which applies positive pulses from the junction between the emitter of transistor T5 and resistor R17 to the output conductors of timing signal circuit TSC1. One such series of positive pulses is applied each time armature 14 passes by coil 16 at the zero degree position of the pulse generator. In a similar manner, timing signals are supplied from timing signal circuits TSC2 through TSC12 at the other angular positions of the pulse generator as indicated in FIGS. 4 and 10.

Continuing with the description of operation of the system in FIGS. 4–9, it will be apparent that application of a zero degree timing signal from timing signal circuit TSC1 in FIG. 4 through cable 166 and branch 166a thereof to NOT logic circuit N9 in FIG. 6 causes ground to be applied to the right-hand input terminal of NOT AND logic circuit NA12. Since all inputs of circuit NA12 now have ground potential, it provides a positive voltage to flip-flop circuit FF12. Circuit NA12 operates as hereinbefore described in connection with FIG. 13.

The plate-on connections of flip-flop circuits FF12 and FF13 are shown in FIG. 18 and the plate-off connections thereof are shown in FIG. 19. As shown in FIG. 18, flip-flop circuit FF12 is provided with a pair of N-P-N transistors T14 and T15. An "on" input terminal $n$ is connected through a resistor R55 to the base of transistor T14. The collector of transistor T14 is supplied with positive voltage from a source DC19 through a resistor R56 and the emitter is connected to ground. The collector of transistor T14 is connected to the base of transistor T15 through a resistor R57. A pair of "off" input terminals $b$ and $e$ are connected through respective resistors R58 and R59 to the base of transistor T15. The collector of transistor T15 is connected through a resistor R60 to the base of transistor T14. The collector of transistor T15 is supplied from a positive voltage source DC20 through a resistor R61 and the emitter is connected to ground. A negative voltage source DC21 is connected through a resistor R62 to the base of transistor T14 and through a resistor R63 to the base of transistor T15. The collector of transistor T15 is connected to "on" output terminal $f$ and the collector of transistor T14 is connected to "off" output terminal $g$.

Flip-flop circuit FF13 is similar to flip-flop circuit FF12 except that it is provided with a different capacitor-coupled "on" input terminal $o$ and an additional capacitor-coupled "off" input terminal $p$. Thus, 'on' input terminal $o$ is connected through a capacitor C11 and a resistor R64 in series to the base of transistor T14. A third "off" input terminal $p$ is connected through a capacitor C12 and a resistor R65 in series to the base of transistor T15. Otherwise, these flip-flop circuits are similar and like elements have been given like reference characters. When flip-flop circuits FF12 and FF13 are in their "off" conditions, transistors T15 therein conduct and transistors T14 do not conduct.

Returning to the description of operation of the plate-on control circuit of press unit No. 1 in FIG. 6, it will be apparent that application of a positive voltage from NOT AND logic circuit NA12 to "on" input terminal $n$ of flip-flop circuit FF12 will cause it to flip to its "on" condition. In FIG. 18, this voltage is applied from input terminal $n$ through resistor R55 to the base of transistor T14. Current flows from positive source DC19 through resistor R56 and the collector and emitter to ground. The collector of transistor T14 shifts to near ground potential so that negative voltage is applied from the junction of resistors R57 and R63 to the base of transistor T15 to render the latter non-conducting. As a result, the collector of transistor T15 shifts from ground to positive voltage which is applied to "on" output terminal $f$. From this it will be apparent that when a positive voltage is applied to the "on" input terminal, a positive voltage is obtained at the "on" output terminal. Similarly, when a positive voltage is applied to one of the "off" input terminals $b$ or $e$ of flip-flop circuit FF12 or "off" input terminals $b$, $e$ or $p$ of flip-flop circuit FF13, a positive voltage is obtained at the associated "off" output terminal $g$ in FIG. 19.

As shown in FIGS. 6 and 18, the "on" output terminal of flip-flop circuit FF12 supplies a positive voltage to "on" input terminal $o$ of flip-flop circuit FF13, through conductor 140 to circuit NA2 in FIG. 5 and through conductor 168 to NOT logic circuit N11 in the ink-on control circuit of press unit No. 1 in FIG. 7. As shown in FIGS. 6 and 19, "off" input terminal $b$ of flip-flop circuit FF12 is supplied with a positive voltage reset signal from conductor 136 and "off" input termnial $e$ is supplied with a positive voltage from NOT AND logic circuit NA13. The "off" output terminal $g$ of flip-flop circuit FF12 supplies positive voltage to "off" input terminal $p$ of flip-flop circuit FF13 and to one terminal of NOR logic circuit NOR3 in the ink-off control circuit of press unit No. 1 in FIG. 7. Conductor 136 supplies a positive voltage reset signal to "off" input terminal $b$ of flip-flop circuit FF13 and "off" input terminal $e$ thereof receives a positive voltage from conductor 150 to afford manual control of the plate-off, ink-off and impression-off solenoids. The "on" output terminal $f$ of flip-flop circuit FF13 supplies positive voltage to the amplifiers for the plate-on hold control solenoid and the plate-off operate control solenoid as shown in FIG. 18. The "off" output terminal g of flip-flop circuit FF13 supplies positive voltage for the amplifiers for the plate-off hold solenoid and the plate-on operate solenoid as shown in FIG. 19.

The pairs of flip-flop circuits in the ink and impression control circuits in FIG. 7 are similar to the pair of flip-flop circuits in the plate control circuit hereinbefore described. Also, the flip flop circuit FF18 in the preset control circuit in FIG. 1 is similar to flip-flop circuit FF12.

Amplifiers EG1 through EG6 in FIGS. 6 and 7 are each similar to the two-stage amplifier E and G in the upper portion of FIG. 5 and shown in detail in FIG. 12. As hereinbefore described, application of a positive voltage to amplifiers E and G from the flip-flop circuit causes energization of the solenoid. In a similar manner, application of a positive voltage to amplifier EG1 causes energization of plate-on hold solenoid PNH in FIG. 6. Also the negative-going output of amplifier EG2 when turned off is applied through conductor 60 to pulse amplifier HJK1 momentarily to energize plate-on operate solenoid PNO as shown in FIG. 19. As will be apparent, only a pulse need be applied to the operate solenoid to perform the plate-on function since the condition is maintained thereafter by the hold solenoid PNH.

Pulse amplifier HJK1 in FIG. 6 comprises three amplifiers similar to amplifiers H, J and K in the upper portion of FIG. 6. The details of amplifier stages H, J and K are shown in FIG. 20. In stage H the input terminal is connected through a coupling capacitor C13 and a resistor R66 in series to the base of a P-N-P transistor T16. A positive voltage source DC22 is connected through a resistor R67 to the base of the transistor and the base of the transistor is connected through a unidirectional conducting diode D4 in its forward direction to ground. The collector of transistor T16 is connected through a resistor R68 to a negative voltage source DC23 in amplifier stage J. The emitter of transistor T16 is connected to the base of a P-N-P transistor T17 in amplifier stage J.

In amplifier stage J, a positive voltage DC24 is connected through a resistor R69 to the base of transistor T17. Source DC24 is also connected through a resistor R70 to the emitter of transistor T17 and to the base of a P-N-P transistor T18 in amplifier stage K. The collector of transistor T17 is connected through a resistor R71 to negative source DC23.

In amplifier stage K, the emitter of transistor T18 is connected to ground and the collector is connected through a small surge suppressor capacitor C14 and a resistor R72 in series to a negative voltage source DC25 of 48 volts or the like. The load such as a solenoid is connected between the collector of transistor T18 and negative source DC24 and a unidirectional conducting diode D5 is connected in its forward direction from negative source DC25 to the collector of transistor T18, that is, across the load to discharge the induced voltage thereof.

For operation of pulse amplifier HJK, it may be assumed that the input signal is a negative-going voltage, that is, the input shifts from a positive voltage to ground or from ground potential to a negative voltage. In the absence of an input signal, that is, ground potential on the input terminal, current flows from positive source DC22 through resistor R67 and diode D4 to ground. The voltage drop in diode D4 is a fraction of a volt so that transistor T16 has a positive emitter to base voltage to make it conduct. Current starts to flow from positive source DC24 through high resistance R69, the emitter and collector of transistor T16 and low resistance R68 to negative source DC23. The voltage drop in resistor R69 reduces the emitter to base voltage of transistor T16 so that the latter conducts only a small amount of current. In other words, transistor T16 floats in a slightly conductive condition. Transistor T17 also floats in a slightly conducting condition since the voltage as reduced by resistor R69 is applied to the base thereof whereas the emitter has a high positive voltage from source DC24. A small amount of current flows from source DC24 through high resistance R70, the emitter and collector of transistor T17 and small resistance R71 to negative source DC23. Resistor R70 reduces the emitter voltage of transistor T17 so that it is slightly above the base voltage. The slightly positive voltage is applied from the emitter of transistor T17 to the base of transistor T18 to maintain the latter non-conducting since its emitter is connected to ground.

When a negative-going input pulse is applied through capacitor C13 and resistor R66, diode D4 blocks current flow from ground and the base voltage of transistor T16 momentarily goes negative. If the input signal is a drop from positive voltage to ground, coupling capacitor C13 is normally charged in one direction through diode D4 to ground and the input signal causes the transistor base voltage to fall from slightly above ground to below ground. If the input signal is a drop from ground to negative voltage, capacitor C13 is normally charged a small amount in the other direction from source DC22 through resistors R67 and R66 and the input signal causes the transistor base voltage to fall from slightly above ground to below ground.

Such drop in base voltage causes a proportional increase in conduction in transistor T16. As a result, resistor R69 decreases the base voltage of transistor T17 to increase the conduction thereof. In turn, resistor R70 decreases the base voltage of transistor T18 below ground or negative to cause transistor T18 to conduct and to energize the load solenoid. Since the load is inductive, diode D5 is provided to dissipate its induced voltage.

A convenient place to get the input pulse for amplifier HJK1 is from the output of direct current amplifier EG2 in the plate-off control circuit in the lower portion of FIG. 6 since the plate-on operate solenoid PNO cannot be operated until the plate-off hold solenoid has been deenergized. It will be recalled from the description of operation of the amplifier in FIG. 12 that transistor T8 normally conducts and a positive input voltage shuts it off and thereby renders transistor T9 conducting to energize the load solenoid. As shown in FIG. 12, output terminal OT shifts from ground to a negative voltage when the amplifier is turned off. Therefore, when flip-flop circuits FF12 and FF13 are flipped "on" to energize amplifier EG1, amplifier EG2 is deenergized at the same time. The output of amplifier EG2 is connected through conductor 60 to the input of amplifier HJK1 and the output of amplifier EG1 is connected through conductor 59 to the input of amplifier HJK2 as shown in FIGS. 18 and 19. In other words, the outputs of the hold amplifiers of the plate-on and plate-off control circuits are cross-connected to the inputs of the operate amplifiers thereof. Therefore, when the plate-on control circuit is operated by a zero degree timing signal, pulse amplifier HJK1 momentarily energizes plate-on operate solenoid PNO to perform the plate-on function and direct current amplifier EG1 energizes plate-on hold solenoid PNH to maintain the plate-on condition until such time as the plate-off control circuit is operated.

The timing diagram in FIG. 23 shows the unit sequence functions performed when the press is started and sheets are passed therethrough. Initially at zero degrees of press rotation, the plate-on enabling function 1PN for press unit No. 1 is performed. This function comprises the energization momentarily of operate solenoid PNO and energization continuously of hold solenoid PNH in the plate-on control circuit. These solenoids are of the permissive type in that they enable the plate-on function to be performed. After these solenoids have been energized as hereinbefore described, the mechanism is prepared or latched so that the plate-on function, that is, application of pressure between the plate and blanket cylinders, can thereafter be performed by the press by camming action or the like. After the plate-on solenoids have been energized, hold solenoid PNH remains energized until a plate-off enabling function 1PF is performed. Although the unit sequence control system continues to run in that timing signals are applied thereto and a timing signal is applied at 35 degrees to the plate-off control circuit, the latter normally does not operate. This is for the reason that ground is being applied to all three inputs of NOR logic circuit NOR2 whereby it supplies a positive voltage to prevent operation of NOT AND circuit NA13. All inputs of circuit NA13 must be grounded before it operates to supply a positive voltage output to the flip-flop circuit. Logic circuit NOR2 can be operated in any one of three ways, from trip-slow switch TS in FIG. 5 through preset flip-flop circuit FF3 and conductors 40 and 68, from master trip switch SW2 in FIG. 5 through flip-flop circuit FF4, amplifier W and conductor 78 or from loss of sheet detector circuit LOS1 in FIG. 6 through conductor 106. Thus, unless the trip-slow switch is turned off or the master trip switch is pressed or a lost sheet condition is detected, plate-on hold solenoid PNH continues to be energized and the plate-off control circuit does not operate.

When flip-flop circuit FF12 was operated as hereinbefore described, positive voltage is applied from its "on" output terminal through conductor 140 to one of the four input terminals of NOT AND logic circuit NA2 in FIG. 5. Circuit NA2 is provided for the purpose of resetting master trip flip-flop circuit FF4 after four conditions occur as hereinafter described. After these four conditions occur, the press units will continue to go off in sequence. Flip-flop circuit FF12 in FIG. 6 also supplies a positive voltage preset signal through conductor 168 to NOT logic circuit N11 in the ink-on control circuit in FIG. 7. As a result, circuit N11 applies ground to the first input terminal of circuit NA14. Ground is applied from signal converter circuit AW3 through conductor 116 to the second input terminal of circuit NA14. As shown at the lower portion of FIG. 6, ground is normally connected through the two diodes of a signal converter circuit such as AW9 to its output terminal. Therefore, when a timing signal is applied at 120 degrees of press rotation to NOT logic circuit N12, the latter applies ground to the third input terminal of circuit NA14 to operate it. As a result, the pair of flip-flop circuits FF14 and FF15 are operated. Amplifier EG4 operates pulse amplifier HJK3 to pulse solenoid KNO. Amplifier EG3 energizes hold solenoid KNH whereby the apparatus is enabled so that the press can perform the ink-on function.

Ink-on solenoid KNH remains energized and the ink-off control circuit normally does not operate except under certain conditions. As shown in FIG. 7, NOR logic circuit NOR3 in the ink-off control circuit has two inputs both of which are normally grounded so that the positive voltage output prevents operation of circuit NA15. The first input terminal of circuit NOR3 is supplied with ground from flip-flop circuit FF12 through conductor 170. The second input terminal is supplied with ground from loss of sheet detector LOS1 through conductor 108. Therefore, the ink-off control circuit is operated if the plate-off control circuit is first operated or if a lost sheet is detected. Either of these two conditions will enable the ink-off control circuit to be operated by the 155 degree timing signal.

Flip-flop circuit FF14 in the ink-on control circuit applies a positive voltage through conductor 172 to NOT logic circuit N14 to permit the 215 degree timing signal to operate the impression-on control circuit provided it is not locked out. Circuit N14 applies ground to the first input terminal of circuit NA16. Ground is supplied to the second input terminal of circuit NA16 through conductor 138 from output terminal f of impression lockout flip-flop circuit FF8 in FIG. 5. Circuit FF8 is in its "off" condition wherein output terminal f is grounded since the blanket roll-up circuit is not being operated. The 215 degree timing signal causes NOT logic circuit N15 to apply ground to the last input terminal of circuit NA16 whereby the latter supplies positive voltage to operate flip-flop circuits FF16 and FF17 in sequence. Solenoids MNO and MNH are energized by cross-connections hereinbefore described to enable the press to perform the impression-on function. Press unit No. 1 is now capable of printing a sheet that is fed therethrough. The impression-off control circuit normally is not operated since it cannot be operated unless the ink-off control circuit is operated first. Normally, flip-flop circuit FF14 supplies ground to NOT logic circuit N16 whereby a positive voltage is maintained on one input terminal of NOT AND logic circuit NA17 to prevent operation thereof.

As shown in the timing diagram of FIG. 23, plate-on enabling function 2PN of press unit No. 2 must not be performed at 300 degrees of the first revolution but must skip this point and be performed at 660 degrees, that is, at 300 degrees of the second revolution. To so delay start of operation of the sequence control circuits of press unit No. 2, the preset-on control circuit is provided. Since the preset-on circuit of press unit No. 1 is arranged to perform its function 1RN at 335 degrees according to FIG. 23, the 300 degree point is effectively skipped.

Flip-flop circuit FF16 in FIG. 7 applies a positive voltage through conductor 176 to NOT logic circuit N18 to enable operation of the preset-on control circuit by the 335 degree timing signal. Circuit N18 applies ground to the first input of circuit NA18. When the 335 degree timing signal arrives, circuit N19 applies ground to the other input of circuit NA18 to operate the latter and flip-flop circuit FF18 to its "on" condition. As a result, positive voltage is applied through conductor 61 as a preset signal for the plate-on control circuit of press unit No. 2. As shown in the timing diagram in FIG. 23, the plate-on, ink-on and impression-on enabling functions 2PN, 2KN and 2MN are performed and the respective solenoids energized at 660, 780 and 875 degrees of press rotation. These solenoids are energized in the manner hereinbefore described in connection with press unit No. 1 in accordance with different timing signals as indicated in FIGS. 7 and 8. Also, the preset signal for press unit No. 2 is obtained from the preset-on control circuit of press unit No. 1 rather than from the feeder preset flip-flop circuit FF3 as in the case of press unit No. 1. As shown in FIGS. 8 and 23, the preset-on circuit of press unit No. 2 performs its function 2RN under the control of the 995 degree timing signal after the 3PN timing signal point has been passed to preset the plate-on control circuit of press unit No. 2 for operation. The "on" control circuits of press units Nos. 3, 4, 5 and 6 are then operated under the control of timing signals indicated in FIGS. 8 and 9 in a similar manner, one revolution being skipped each time before a plate-on circuit is operated.

When flip-flop circuit FF18 in the preset-on control circuit of press unit No. 1 is operated as hereinbefore described, a positive voltage is also applied through conductors 61 and 144 to NOT AND logic circuit NA2 in FIG. 5. When the impression-on control circuit of press unit No. 2 is operated, the first flip flop circuit thereof applies a positive voltage through conductor 142 to NOT AND logic circuit NA2. It will be apparent from the foregoing that positive voltage is applied to the three lower input terminals of NOT AND logic circuit NA2 in FIG. 5 whereas ground potential is normally applied to its upper input terminal from conductor 32.

When the impression-on control circuit of the last press unit, that is, No. 6, is operated, the first flip-flop circuit thereof applies positive voltage through conductor 146 to NOT AND logic circuit NA1 in FIG. 5.

In the event trip-slow switch TS in FIG. 5 is turned off either manually or automatically by a solenoid or the like due to an abnormal condition such as a jam in the press, solenoid FS1 is deenergized to stop the feeding of sheets and fast relay FR is deenergized to trip the press speed to a low value. In trip-slow switch TS, contacts A and C open and contacts B and D close. Contact B applies positive voltage to "off" input terminal $d$ of feeder flip-flop circuit FF1. As shown in FIG. 11, such positive voltage is applied through resistor R29 to the base of transistor T7 to render the latter conducting and to render transistor T6 non-conducting. As a result, ground potential is applied to output terminal $f$ and positive voltage is applied to output terminal $g$. Such ground potential at output terminal $f$ causes feeder solenoid FS1 in FIG. 5 to be deenergized to stop the feeding of sheets. Such ground potential is also applied from output terminal $f$ through conductor 30 to the upper input terminal of circuit NA1. The function of NOT AND logic circuit NA1 is to decrease the press speed when the last unit of the press goes off impression.

Contact D of trip-slow switch TS applies positive voltage to input terminal $d$ of preset flip-flop circuit FF3. As a result, the latter applies ground potential to output terminal $f$ and positive voltage to output terminal $g$. Such positive voltage is applied through conductors 40 and 68 to logic circuit NOR2 in the plate-off control circuit of press unit No. 1. As a result, circuit NOR2 applies ground potential to the left-hand input terminal of NOT AND logic circuit NA13. This enables the plate-off control circuit to be operated by the timing signal. At 35 degrees of the next press revolution, timing signal circuit TSC2 in FIG. 4 applies a timing signal to NOT logic circuit N10 in FIG. 6 to apply ground potential to the right-hand input terminal of circuit NA13. Since ground potential is also being applied to the two middle input terminals of NOT AND circuit NA13 from amplifier W1 of the blanket roll-up circuit and plate-up circuit PU1, circuit NA13 applies positive voltage to operate flip-flop circuits FF12 and FF13 and amplifiers EG2 and HJK2 and plate-off enabling solenoids PFO and PFH. These solenoids enables press unit No. 1 to perform the plate-off function, that is, to thereafter prevent the press from applying pressure between the plate and blanket cylinders.

The plate-off control circuit presets the ink-off control circuit through conductor 170 so that the 155 degree timing signal will operate the ink-off control solenoids KFO and KFH. The 240 degree timing signal operates the impression-off control circuit and the 360 degree timing signal operates the preset-off control circuit of press unit No. 1. In a similar manner, the "off" control circuits of press units Nos. 2–6 are operated in the normal consecutive order shown in the timing diagram of FIG. 23.

When the last press unit impression-off control circuit is operated, the "on" output terminal of the first flip-flop circuit therein, similar to output terminal $f$ of flip-flop circuit FF12 in FIG. 18, switches to ground potential. As shown in the upper right-hand portion of FIG. 9, this ground potential is applied from the impression-on control circuit of press unit No. 6 through conductor 146 to the lower input terminal of NOT AND circuit NA1 in FIG. 5. Since ground is now applied to both input terminals, circuit NA1 applies positive voltage to "off" input terminal $j$ of trip slow flip-flop circuit FF2 to flop the latter to its "off" condition. The resultant positive voltage at output terminal $g$ operates amplifier E1 to afford a negative voltage output, see FIG. 12, to deenergize fast relay FR thereby to decrease the press speed to a low value. The press now runs at its trip-slow speed until trip-slow switch TS is again turned to its first position to start the feeding of sheets and then turned to its second position to accelerate the press.

The feeder can also be tripped and the press decelerated by pressing feeder trip switch SW1 in the left-hand portion of FIG. 5. When switch SW1 is opened, signal converter AW1 applies ground potential to NOT circuit N1.

A similar signal converter is shown in detail at the lower portion of FIG. 6 and it is seen that disconnection of the input results in ground being connected through the two diodes 158 and 162 to the output. NOT circuit N1 applies positive voltage to "off" input terminals $c$ and $e$ of flip-flop circuits FF1 and FF3 to flop the latter to their "off" conditions in the same manner as described in connection with contacts B and D of trip-slow switch TS. The feeding of sheets will be stopped and when the last press unit goes off impression, the press will be decelerated in the same manner as when the trip-slow switch is turned off. Normal operation may then be resumed by turning trip-slow switch off first and then in steps to its first and second positions. Feeder trip switches such as SW1 may be connected in series with one another and located in a plurality of places such as at each press unit. In this manner, the feeder trip function may be performed from the desired locations at the press units whereas trip-slow switch TS would be located on the master console. Feeder trip switch SW1 is pressed when it is observed that some abnormal condition has occurred which permits operation of the plate-off, ink-off and impression-off control circuits in their normal sequence.

When a more serious or dangerous abnormal condition occurs requiring that sheet feeding be stopped, that the press be decelerated and the unit sequence "off" control circuits be operated sooner than their normal sequence, master trip switch SW2 is pressed. A plurality of such master trip switches may be connected in series and located at the several units of the press. When a master trip switch SW2 is pressed, signal converter AW2 applies ground potential to NOT circuit N2 whereby the latter applies positive voltage to input terminal $h$ of master trip flip-flop circuit FF4. The latter applies positive voltage from output terminal $f$ to operate amplifier W. As shown in FIG. 15, amplifier W is an emitter follower circuit having a low impedance output which applies positive voltage when transistor T12 conducts to a plurality of places. Such positive voltage is applied through conductor 36 to "off" input terminals $e$ and $c$ of flip-flop circuits FF1 and FF3 to stop the feeding of sheets and to preset the plate-off control circuit of press unit No. 1 for operation as hereinbefore described. Such positive voltage is also applied through conductor 36 to "off" input terminal $c$ of trip-slow flip-flop circuit FF2 to deenergize relay FR and decelerate the press immediately without waiting until all units are off impression as in the case of feeder trip.

Amplifier W also applies positive voltage through conductor 78 to circuit NOR2 in FIG. 6 in addition to the voltage applied thereto from preset flip-flop circuit FF3 through conductors 40 and 68 to insure that the plate-off control circuit of press unit No. 1 operates under the control of the 35 degree timing signal. Such positive voltage is also applied from conductor 78 through conductor 80 to the plate-off control circuits of the remaining press units Nos. 2–6. This positive voltage on conductor 80 overrides the preset-off control circuits of press units Nos. 1 through 5 so that the unit "off" control circuits of the press units will be operated sooner without waiting for their normal sequence. Of course, the plate-off, ink-off and impression-off control circuits of each press unit will still be operated in sequence but the plate-off control circuits of the press units will start operating immediately in an order depending upon the angular position of the timing pulse generator at the time that master trip-switch SW2 in FIG. 5 is pressed. For example, it will be seen from the timing diagram in FIG. 23 that if the armature of the timing pulse generator is moving between 60 and 95 degrees when the master trip switch is pressed, the plate-off control circuit of press unit No. 6 will be the first one to be operated at 95 degrees as indicated by 6PF. Then the plate-off control circuit of press unit No. 5 will be operated at 155 degrees as shown by 5PF in FIG. 23. At 215 degrees, the plate-off control circuit of press unit No. 4 and the ink-off control circuit of press unit No. 6 will be operated as shown by 4PF and 6KF, respectively. At 275 degrees, the plate-off control circuit of press unit No. 3 and the ink-off control circuit of press unit No. 5 will be operated as shown by 3PF and 5KF, respectively. At 300 degrees, the impression-off control circuit of press unit No. 6 will be operated as shown by 6MF in FIG. 23. The operations of the unit sequence control circuits continue as shown in FIG. 23 until at zero degrees of the second revolution following pressing of the master trip switch, the preset-off control circuit of press unit No. 1 will be operated as shown by 1RF to complete the "off" control operations. If the master trip switch is pressed between 240 and 275 degrees the plate-off control circuits will be operated in the order 3, 2, 1, 6, 5, 4 referring to press units.

Master trip flip-flop circuit FF4 in FIG. 5 is automatically reset to its "off" condition as hereinafter described. When switch SW2 recloses, ground potential is again applied from NOT circuit N2 through conductor 32 to the first input terminal of NOT AND circuit NA2. Ground potentials are also applied from the No. 1 plate-on, No. 1 preset-on and No. 2 impression-on control circuits through conductor 140, conductors 60 and 144 and conductor 142, respectively, to the other three input terminals of NOT AND circuit NA2 in FIG. 5. As a result, circuit NA2 applies positive voltage to "off" input terminal *j* of master trip flip-flop circuit FF4 to restore the latter to its "off" condition.

Under master trip conditions, the aforementioned positive voltage on conductor 80 which overrides the preset-off control circuits is also applied from conductor 80 in FIGS. 6–9 through conductors 92, 94, 96, 98, 100 and 102 to the plate-on control circuits of the respective press units to prevent operation of the same. As shown in FIG. 6, application of a positive voltage through conductor 92 to one of the four input terminals of NOT AND circuit NA12 maintains the output of the latter at ground potential so that circuit NA13 can operate flip-flop circuit FF12 to its "off" condition.

Loss of sheet detector circuits LOS1 through LOS6 in FIGS. 6–9 detect misplaced or "lost" sheet conditions at the feed cylinder and successive transfer cylinders, respectively, in FIG. 1. If such condition is detected at the feed cylinder, a signal is applied through conductor 124 in FIG. 6 to circuit LOS1 in the manner described in the aforementioned copending application. As a result, circuit LOS1 applies a positive voltage through conductor 104 to lock out the plate-on control circuit of press unit No. 1. Such positive voltage is also applied through conductors 106 and 108 to preset the plate-off and ink-off control circuits of press unit No. 1 for operation. Such positive voltage is further applied through conductor 110 and cable 112 to the upper input terminal of OR circuit OR1 in the upper left-hand portion of FIG. 5. As a result, circuit OR1 applies a positive voltage, in accordance with a detailed description thereof hereinafter appearing, to input terminals *b* of flip-flop circuits FF1 and FF3 to restore the latter to their "off" conditions. This causes stopping of feeding of sheets and operation of the unit sequence "off" control circuits followed by deceleration of the press as hereinbefore described in connection with restoration of trip-slow switch TS to its "off" position. Preset flip-flop circuit FF3 applies a positive voltage from its output terminal *g* through conductors 40 and 68 to NOR circuit NOR2 in the plate-off control circuit of press unit No. 1 to maintain operation of circuit NOR2 when the loss of sheet signal terminates. Such positive voltage is also applied through conductors 40 and 70 to restore loss of sheet circuit LOS1 to its normal condition whereby to terminate the output voltage from circuit LOS1.

Figure 21:
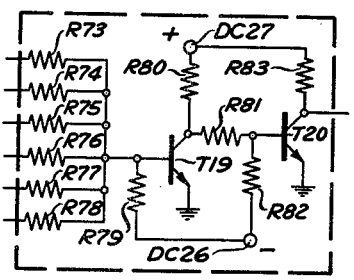

The details of OR circuit OR1 are shown in FIG. 21. As shown therein, circuit OR1 has six input terminals and an output terminal. If a positive voltage is applied to any input terminal, a positive voltage is obtained from the output terminal. The input terminals are connected through respective current limiting resistors R73 through R78 to the base of an N-P-N transistor T19 and the base of the transistor is connected through a resistor R79 to a negative voltage source DC26. A positive voltage source DC27 is connected through a resistor R80 to the collector of transistor T19 and the emitter is connected to ground. The collector of transistor T19 is connected through resistors R81 and R82 to negative source DC26 and the junction of these resistors is connected to the base of an N-P-N transistor T20. Positive source DC27 is connected through a resistor R83 to the collector of transistor T20 and the emitter of the latter is connected to ground. The collector of transistor T20 is connected to the output terminal.

In the absence of an input signal such as connection of ground to all input terminals, transistor T19 does not conduct. Transistor T20 conducts because positive voltage is applied from the junction of resistors R81 and R82 to the base thereof. Thus, ground potential appears at the output terminal. Application of a positive voltage to any one or more input terminals causes transistor T19 to conduct. Current flows from positive source DC27 through resistor R80 and the collector and emitter to ground. Such conduction decreases the collector voltage of transistor T19 to substantially ground potential value whereby a negative voltage is applied from the junction of resistors R81 and R82 to the base of transistor T20 to render the latter non-conducting. As a result, positive voltage is applied from source DC27 through resistor R83 to the output terminal.

The purpose of the blanket roll-up control circuit in the right-hand portion of FIG. 5 and the left-hand portion of FIG. 6 is to pre-ink the press units before sheets of paper are fed therethrough. When the press is started running at slow speed, contact RUN in FIG. 5 closes. As will be apparent, this is an interlocking contact which enables operation of the blanket roll-up control circuit when the press has been started at a slow speed.

Selector switch SS1 in FIG. 6 may be manually set for the number of pre-inking revolutions desired. The press units will be pre-inked for the number of press revolutions selected and the pre-inking will be automatically stopped. Let it be assumed that selector switch SS1 is set at stationary contact 2 to select two pre-inking revolutions. After the press is running as aforesaid, the blanket roll-up is started by pressing switch SW3 in FIG. 5. Positive voltage is applied through contact RUN and switch SW3 to input terminal *a* of blanket roll-up (BRU) pre-set flip-flop circuit FF5. This causes output terminal *g* of the preset flip-flop circuit to switch from positive voltage to ground potential to energize relay BRUR. Amplifier E2 normally supplies negative voltage to relay BRUR so that the latter is not energized but connects ground potential to the relay when flip-flop circuit FF5 is operated.

Amplifier E2 is similar to amplifiers E and E1 hereinbefore described and shown in detail as stage E in FIG. 12. It will be seen that at positive voltage input thereto, transistor T8 does not conduct. At such time, negative voltage is supplied from source DC8 through resistor R33 to relay BRUR to maintain the latter deenergized. When preset flip-flop circuit FF5 is operated, ground potential is applied to the input of amplifier E2. This renders the base of transistor T8 negative to cause it to conduct. The current flows from ground through transistor T8 and relay BRUR to energize the latter and close its contact BRUR1. This contact may be connected to light an indicator lamp or the like to indicate that blanket roll-up has been started and is "on." Flip-flop circuits FF5, FF6, FF7 and FF8 are similar to circuit FF4 shown in detail in FIG. 16 except that different terminals are used in each case.

Ground potential is also applied from output terminal *g* of flip-flop circuit FF5 through conductor 44 as a first input signal to NOT AND logic circuit NA3 and to "off" input terminal e of blanket roll-up (BRU) "on" flip-flop FF6 to permit operation of the latter. The blanket roll-up circuit is now in its preset condition from which it is automatically controlled by timing signals to pre-ink the press for the selected number of revolutions.

Timing signal circuit TSC2 in FIG. 4 applies a 35 degree timing signal through conductor 48 to NOT logic circuits N3 and N4 and to "off" input terminal e of counter driver flip-flop circuit FF7 in FIG. 5. NOT logic circuits N3 and N4 are like circuit N1 hereinbefore described and shown in detail in FIG. 14 so that the positive voltage timing input signal causes these NOT circuits to apply ground potentials to the lower input terminals of NOT AND circuits NA3 and NA5, respectively. Circuit NA3, which is like circuit NA1 hereinbefore described and shown in detail in FIG. 13, responds to ground at both input terminals thereof to apply a positive voltage to input terminal h of flip-flop FF6. As a result, the latter operates to apply a positive voltage from its output terminal f to amplifier W1. Amplifier W1, which is like amplifier W hereinbefore described and shown in detail in FIG. 15, applies an amplified positive voltage through conductor 46 to the upper input terminal of circuit NA5 and to "on" input terminal h of impression lockout flip-flop FF8. The positive voltage input causes circuit NA5 to provide a ground potential output to "off" input terminal e to permit operation of flip-flop FF8. The positive voltage input at terminal h operates impression lockout flip-flop FF8 to apply a positive voltage output through conductor 138 to NOT AND logic circuit NA16 in the impression-on control circuit of press unit No. 1 in FIG. 7. This positive voltage is also applied from conductor 138 to similar NOT AND circuits in the impression-on control circuits of the other press units as shown in FIGS. 8 and 9. As will be apparent, this positive voltage prevents operation of the impression-on control circuits and in that way locks them out of operation for the duration of the blanket roll-up operation to prevent smearing of ink on the impression cylinders since sheets are not being fed through the press.

Amplifier W1 also applies a positive voltage through conductor 52 to NOT logic circuits N6, N7 and N8 in FIG. 6 which are like circuit N1 hereinbefore described and shown in detail in FIG. 14. As a result, circuits N6, N7 and N8 apply ground potentials to "off" input terminals e of revolution counter flip-flop circuits FF9, FF10 and FF11, respectively, to reset the same for operation by revolution counting pulses from counter driver flip-flop FF7 as hereinafter described.

Figure 22:
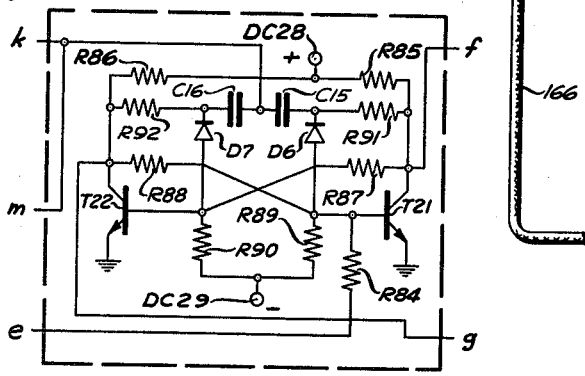

Flip-flop circuits FF9, FF10 and FF11 are alike and the details of such circuits are shown in FIG. 22. As shown therein, input terminals k and m are connected to a common point so that successive negative-going input pulses render N-P-N transistors T21 and T22 alternately conducting. Reset signal input terminal e is connected through a resistor R84 to the base of transistor T21. A positive voltage source DC28 is connected through a resistor R85 and the collector and emitter of transistor T21 to ground and is connected through a resistor R86 and the collector and emitter of transistor T22 to ground. The collector of transistor T21 is connected through a resistor R87 to the base of transistor T22 and the collector of the latter is connected through a resistor R88 to the base of transistor T21. A negative voltage source DC29 is connected through a resistor R89 to the base of transistor T21 and is connected through a resistor R90 to the base of transistor T22. The collector of transistor T21 is connected through a resistor R91 and a coupling capacitor C15 to the common input terminal. The collector of transistor T22 is connected through a resistor R92 and a coupling capacitor C16 to the common input terminal. The base of transistor T21 is connected through a unidirectional diode D6 in its forward direction to the junction between resistor R91 and capacitor C15. Similarly, the base of transistor T22 is connected through a diode D7 to the junction between resistor R92 and capacitor C16.

The flip-flop circuit in FIG. 22 is reset so that transistor T21 normally conducts by applying positive voltage through reset terminal e and resistor R84 to the base of transistor T21. The collector of transistor T21 maintains the base of transistor T22 negative so that the later normally does not conduct. The first negative-going input pulse, that is, change from a positive voltage to ground potential at input terminals k and m, flips the circuit so that transistor T22 conducts and transistor T21 does not conduct; the second like input signal restores the original condition, etc., it being assumed that the positive voltage resetting signal at input terminal e has been changed to ground potential.

When positive voltage is being applied to input terminals k and m and transistor T21 conducts, current flows from the common input terminal through resistor R91 and transistor T21 to charge capacitor C15. Capacitor C16 does not charge because positive voltage is applied to both sides thereof from the common input terminal and from source DC28 through resistors R86 and R92. A negative-going pulse on the common input terminal causes the right-hand side of capacitor C15 to drop from slightly above ground potential to a negative value. This negative pulse is applied through diode D6 to the base of transistor T21 to render the latter non-conducting. As a result, a positive voltage is applied from the collector of transistor T21 through resistor R87 to the base of transistor T22 to render the latter conducting. Capacitor C15 then discharges to ground. When the input voltage goes positive, transistor T22 continues to conduct and capacitor C16 now charges by current flow through resistor R92 and transistor T22. On the next negative-going input pulse, the original condition wherein transistor T21 conducts and transistor T22 does not conduct is re-established. In this manner, successive negative-going input pulses render transistors T21 and T22 alternately conducting. When transistor T21 conducts, output terminal f is at substantially ground potential and output terminal g has a positive voltage and vice versa when transistor T22 conducts.

Returning now to the description of operation of the blanket roll-up circuits in FIGS. 5 and 6, it will be apparent that before amplifier W1 operated NOT circuits N6, N7 and N8, the latter applied positive voltages to reset terminals e of flip-flops FF9, FF10, and FF11. This caused ground potential to appear at output terminals f of these flip-flops and caused positive voltages to be applied to output terminals g thereof. As a result, multiple conductors 1, 3 and 5 in FIG. 6 have positive voltage and conductors 2, 4 and 6 are grounded as indicated at the lower ends thereof by plus and zero signs, respectively.

Ground potential is applied from output terminal g of flip-flop FF6 in FIG. 5 to the upper input terminal of NOT AND circuit NA4 to prepare this circuit for operation by a 60 degree timing signal. Following the 35 degree timing signal which operates blanket roll-up "on" flip-flop FF6 and impression lockout flip-flop FF8, as the press continues to rotate, a 60 degree count signal is applied from timing signal circuit TSC3 in FIG. 4 through conductor 50 to NOT circuit N5. Circuit N5 applies ground potential to the lower input terminal of NOT AND circuit NA4. Since ground is now applied to both input terminals, circuit NA4 applies positive voltage to input terminal h of counter driver flip-flop FF7. As a result, the positive voltage previously appearing at output terminal g of flip-flop FF7 drops to ground value so that a negative-going pulse is applied through conductor 54 to the common input terminal k–m of flip-flop FF9 in FIG. 6. Since counter flip-flops FF9, FF10 and FF11 are of the type having a common input terminal whereby they are flipped "on" and also flopped "off," such common terminal has been shown as comprising an "on" input terminal k and an "off" input terminal m connected to one another to illustrate the nature of the circuits in the schematic showing in FIG. 6. This negative-going pulse flips circuit FF9 so that multiple conductor 1 is grounded and conductor 2 has a positive voltage. This operation of counter flip-flop FF9 does not operate any of the NOT AND circuits NA6–NA11 because the first pre-inking revolution has not yet been completed but merely started. Instead, the system is constructed so that this first count pulse is absorbed.

Amplifier W1 also applies a positive voltage through conductors 52 and 56 as a preset signal to the middle input terminal of circuit NOR1 in the plate-on control circuit of press unit No. 1. This preset signal is also applied from conductor 56 through conductor 72 as a preset signal to like points in the plate-on control circuits of press units Nos. 2–6. These preset signals override the preset-on control circuits of the press units so that the plate-on and ink-on enabling functions of the press units will be started sooner and in the reverse order from press unit No. 6 to press unit No. 1. Since the impression-on solenoids of all the press units are locked out as aforementioned, only the plate-on and ink-on solenoids of the press units will be energized for blanket roll-up.

At the same time as the 60 degree count pulse which is ultimately absorbed as aforesaid is applied to NOT circuit N5 in FIG. 5, a 60 degree timing signal is also applied to the plate-on control circuit of press unit No. 6 as indicated in FIG. 9 to energize the plate-on operate and hold solenoids thereof as shown by 6PN in the timing diagram of FIG. 23. The 120 degree timing signal 5PN operates the plate-on control circuit of press unit No. 5. At 180 degrees, the plate-on control circuit of press unit No. 4 and the ink-on control circuit of press unit No. 6 are operated as indicated by 4PN and 6KN in FIG. 23. The 240 degree timing signals 3PN and 5KN operate the plate-on control circuit of press unit No. 3 and the ink-on control circuit of press unit No. 5. The 300 degree timing signals 2PN and 4KN operate the plate-on control circuit of press unit No. 2 and the ink-on control circuit of press unit No. 4. The plate-on control circuit of press unit No. 1 and the ink-on control circuit of press unit No. 3 are operated by the 360 degree timing signals 1PN and 3KN. At 60 and 120 degrees of the second press revolution of blanket roll-up operation, the ink-on control circuits of press units Nos. 2 and 1 are operated, respectively.

At 60 degrees of such second revolution, the first revolution of blanket roll-up is counted and the count registered in the following manner. It will be recalled that following absorption of the first count pulse in FIG. 6, flip-flop FF9 has been flipped and flip-flops FF10 and FF11 are in their reset condition. Under this condition, in FIG. 6 multiple conductors 1, 4 and 6 are grounded and conductors 2, 3 and 5 have a positive voltage. The 35 degree timing signal on the second revolution is applied to input terminal e of counter driver flip-flop FF7 in FIG. 5 to reset the same so that positive voltage is applied from output terminal g thereof through conductor 54 to counter flip-flop FF9 in FIG. 6. Since this is a positive-going pulse, it does not operate flip-flop FF9.

The 60 degree timing signal is applied through conductor 50 to NOT circuit N5 in FIG. 5 to cause the latter to apply ground potential to the lower terminal of NOT AND circuit NA4. Since both input terminals have ground potential, circuit NA4 provides a positive voltage to operate counter driver flip-flop FF7. The latter now applies a negative-going pulse to counter flip-flop FF9 to flop the latter to its original condition. Flip-flop FF9 applies a negative-going pulse from its output terminal f to common input terminal k–m of counter flip-flop FF10 to flip the latter. As a result, multiple conductors 1, 4 and 5 have positive voltage and conductors 2, 3 and 6 have ground potential from the counter flip-flops. The ground potential on conductors 2, 3 and 6 causes operation of NOT AND logic circuit NA6 to apply positive voltage to stationary contact 1 of selector switch SS1. The first blanket roll-up revolution has now been counted and the count registered.

In a similar manner on the next revolution, the 35 degree timing signal resets counter driver flip-flop FF7 and the 60 degree timing signal reoperates the same to apply a negative-going pulse to counter flip-flop FF9. The latter flips to a condition wherein conductors 1, 3 and 6 have ground potential and the other conductors have positive voltage. The ground potentials on conductors 1, 3 and 6 operate NOT AND circuit NA7 to apply positive voltage to the second stationary contact of selector switch SS1 whereby the second revolution has been counted and the count registered.

In a simillar manner, additional revolutions can be counted in accordance with the setting of selector switch SS1. It will be apparent that the three input terminals of the NOT AND circuits NA6–NA11 are connected to the multiple conductors so that each successive count pulse will operate a successive NOT AND circuit to energize a corresponding contact of selector switch SS1. Since it was heretofore assumed that selector switch SS1 was set on the second contact, when the second revolution count is registered, NOT AND circuit NA7 applies a positive voltage through the second stationary contact and the brush of selector switch SS1 and conductor 58 as a stopping signal to "off" input terminal e of BRU preset flip-flop FF5 in FIG. 5. This restores the preset flip-flop to its original condition to deenergize relay BRUR and extinguish the indicator by reopening the relay contact. Flip-flop FF5 applies positive voltage through conductor 44 to "off" input terminal e of flip-flop FF6 to turn the latter "off." Flip-flop FF5 also applies positive voltage through conductor 44 to the upper input terminal of circuit NA3 to prevent operation of the latter by the 35 degree timing signal.

The next 35 degree timing signal is applied to terminal e of flip-flop FF7 to reset the latter. Flip-flop FF6 applies positive voltage from its terminal g to the upper input terminal of circuit NA4 to prevent the 60 degree timing signal from operating flip-flop FF7. Flip-flop FF6 applies ground potential from its output terminal f to turn amplifier W1 off. As seen in FIG. 15, amplifier W1 applies ground potential when turned off through conductor 46 in FIG. 5 to the upper input terminal of NOT AND circuit NA5. This enables the 35 degree timing signal to cause operation of circuit NA5 to reset impression lockout flip-flop FF8. This 35 degree timing signal is applied from conductor 48 in FIG. 5 to circuit N4. The latter applies ground to the lower input terminal of circuit NA5. As a result, circuit NA5 applies positive voltage to "off" input terminal e of impression lockout flip-flop FF8 to restore the latter to its "off" condition and to substitute ground for the previous positive voltage on conductor 138. The impression-on control circuits of the press units are no longer locked out.

The manner in which the unit sequence control circuits are restored to their original condition at the end of blanket roll-up, that is, the manner in which the plate-off and ink-off control circuits of the press units are operated, will now be described. It will be recalled that during blanket roll-up, amplifier W1 in FIG. 5 applied positive voltage through conductors 52 and 56 and 72 as a preset signal for the plate-on control circuits of the press units. This positive voltage was also applied from conductor 56 through conductor 76 in FIGS. 6–9 to NOT AND circuit NA13 in the plate-off control circuit of press unit No. 1 and to similar points in the plate-off control circuits of press units Nos. 2–6 to lock out these circuits during blanket roll-up. At the end of blanket roll-up, ground potential is substituted for such positive voltage at amplifier W1. Ground potential is also applied to circuit NA13 from circuit NOR2. This is due to the fact that preset flip-flop FF3 in the feeder control circuit in FIG. 5 is "off" whereby a positive voltage preset signal is applied therefrom through conductors 40 and 68 to operate circuit NOR2. Since the preset-on control circuits of press units Nos. 1–5 were not operated during blanket roll-up, the preset-off control circuits maintain preset signals on the plate-off control circuits of press units Nos. 2–6. Therefore, when the blanket roll-up stop signal is applied from selector switch SS1 and BRU "on" flip-flop FF6 turns "off," the plate-off control circuits of the press units are operated in the reverse order from press unit No. 6 to press unit No. 1, respectively, each followed by operation of the associated ink-off control circuit thereof.

As shown in FIG. 23, plate-off timing signal 6PF is applied at 95 degrees following the 60 degree stopping signal to operate the plate-off control circuit of press unit No. 6. The plate-off control circuits of press units Nos. 5 through 1 are then operated in sequence by the 155, 215, 275, 335 and 35 degree timing signals. The ink-off control circuits are operated after the associated plate-off control circuits by the 215, 275, 335, 35, 95 and 155 degree timing signals. Thus, the unit sequence control circuits are restored to their original condition.

From the foregoing, it will be apparent that the blanket roll-up stopping signal is applied in response to registration of the 60 degree count signal but that the impression lockout is maintained for almost another revolution. Following initiation of stopping at 60 degrees, the impression-on circuits are held locked out for 335 degrees more or until the next 35 degree timing signal resets impression lockout flip-flop FF8 as hereinbefore described. This delay in terminating impression lockout is provided to prevent any of the press units from going on impression before the ink-off control circuits are operated. Since the ink-on control circuits are operated during blanket roll-up and they supply preset signals to the associated impression-on control circuits, the timing signals would operate the latter unless impression lockout is maintained for a period of time. Referring to FIG. 23, it will be seen that if impression lockout were terminated at the 60 degree stopping signal, the 95 degree timing signal would operate the impression-on control circuit of press unit No. 3 as shown by 3MN if lockout were not maintained. However, at 35 degrees of the next revolution when impression lockout is terminated, the ink-off control circuits of press units Nos. 6, 5, 4 and 3 have been operated to remove the preset signals from the associated impression-on control circuits thereby to prevent operation of the latter. The ink-off control circuits of press units Nos. 2 and 1 are then operated at 95 and 155 degrees as shown by 2KF and 1KF to remove the preset signals ahead of possible operation of the associated impression-on control circuits as shown by 2MN and 1MN thereby to prevent application of ink onto the impression cylinders.

Amplifier W1 when turned off, also applies ground through conductor 52 to NOT circuits N6, N7 and N8 whereby the latter apply positive voltages to reset counter flip-flops FF9, FF10 and FF11 to their "off" or zero minus one position when blanket roll-up operation is completed.

Since sheets are not fed into the press during the time that the press units are being pre-inked during blanket roll-up, loss of sheet circuits LOS1–LOS6 receive lost sheet signals. If these loss of sheet circuits were allowed to respond to lost sheet signals, they would activate alarms and interfere with blanket roll-up operation. It has therefore been found desirable to lock out the loss of sheet circuits during blanket roll-up operation. For this purpose, positive voltages are applied from conductors 56 and 72 in FIGS. 6–9 through conductors 74, 82, 84, 86, 88 and 90 to the loss of sheet circuits LOS1–LOS6 to maintain the latter "off" so that lost sheet signals cannot operate the same. These lockout voltages are applied to connections similar to the auxiliary preset control connections in the output flip-flop circuits in the loss of sheet circuits as shown in the aforementioned co-pending application to prevent the same from being flipped by input pulses.

Plate-up control circuits PU1 through PU6 shown in FIGS. 7–9 are provided for the purpose of affording operation of the plate-on control circuits and for locking out the ink-on control circuits of the press units. After the printing plates have been installed on the plate cylinders, it might be desirable to apply rolling pressure on the printing plates to press them evenly on the cylinders before pre-inking or printing. To do this, selector switches SS2 through SS7, one for each press unit are turned on. As shown in FIG. 7 in connection with plate-up circuit PU1, alternating current is applied through switch SS2 to signal converter AW3. This signal converter is like circuit AW9 at the bottom of FIG. 6 whereby a rectified positive voltage is applied therefrom through conductor 114 to circuit NOR1 to preset the plate-on control circuit of press unit No. 1 for operation by the next zero degree timing signal. This positive voltage is also applied through conductor 116 to NOT AND circuit NA14 to lock out the ink-on control circuit of press unit No. 1 from operation. The plate-on control circuits of the other press units are similarly preset and their ink-on control circuits are locked out. This positive voltage is also applied from signal converter AW3 through conductors 118 and 120 to maintain loss of sheet circuit LOS1 off since sheets are not fed during this operation. This positive voltage is further applied from conductor 118 through conductor 122 to NOT AND circuit NA13 to prevent operation of the plate-off control circuit of press unit No. 1. The other plate-off control circuits and loss of sheet circuits are similarly locked out from the associated plate-up control circuits PU2–PU6.

The press is then started and the timing signals operate the plate-on control circuits of the press units in the order shown in FIG. 23 thereby to enable pressure to be applied between the blanket cylinders and the plate cylinders to press the printing plates. When selector switches SS2–SS7 are opened, the timing signals operate the plate-off control circuits as hereinbefore described to restore the unit sequence control circuits to their "off" condition.

A plurality of manual circuits, one for each press unit, are shown at the lower portions of FIGS. 6–9, these circuits being manually operable from selector switches SS8 through SS13. Since these manual circuits are alike, only the circuit associated with press unit No. 1 will be described with respect to its function.

As shown in the lower portion of FIG. 6, selector switch SS8 is provided with an "off" position, a "dry" position and an "on" position. In the "dry" position, alternating voltage is applied through level Y of switch SS8 to signal converter AW9. The latter applies rectified positive voltage through conductors 152 to an "off" input terminal (terminal e in FIG. 19) of flip-flop FF15 to maintain the latter in its "off" condition. Under this condition, flip-flop FF15 is maintained "off" to maintain solenoid KFH energized although flip-flop FF14 may be operated in its normal sequence by the timing signal. As shown in FIG. 19, the first flip-flop is capacitor coupled to the second flip-flop as by capacitor C12 so that when the first flip-flop is operated by the timing signal, the pulse applied through the capacitor does not operate the second flip-flop which is held "off." In this manner, any press unit may be run dry as desired. For example, it might be desirable to run the first press unit dry so that it will iron the sheets of paper before they are printed in the succeeding press units. Or any selected press unit may be run dry if it is desired to omit the color that it normally prints.

When selector switch SS8 is turned to its "on" position at the lower portion of FIG. 6, positive voltage is applied through switch level X and conductors 148 and 150 to maintain flip-flop FF13 in the plate-off control circuit in its "off" condition. Such voltage is also applied through conductor 148 to maintain flip-flop FF17 in the impression-off control circuit in its "off" condition. Positive rectified voltage is applied from signal converter AW9 through conductor 152 to maintain flip-flop FF15 in the ink-off control circuit in its "off" condition as hereinbefore described. Under this condition, the unit sequence control circuits of press unit No. 1 have been locked out. In other words, press unit No. 1 has been taken out of operation. In a similar manner, any desired press unit may be taken out of operation if it is not desired to use the same. However, the timing signals may still operate the first flip-flops in these circuits so that "on" and "off" preset signals are provided from the impression-on and impression-off control circuits of press unit No. 1 to operate the preset-on and preset-off control circuits and the plate-on and plate-off control circuits of press unit No. 2. When selector switch SS8 is turned to its "off" position, press unit No. 1 is automatically put back into normal sequence operation when the press is run.

An inked clutch limit switch LS1 is connected across level Y of selector switch SS8 at the lower portion of FIG. 6. This limit switch is of the normally closed type and opens when the inker clutch is engaged. This limit switch is a safety device which interlocks the ink-off control circuit to the inker clutch so that the ink-on control circuit of press unit No. 1 cannot be operated unless the inker clutch is engaged and thereby prevents the plate cylinder from driving the ink rolls in the opposite direction from their normal direction of operation. As will be apparent, whenever the inker clutch is disengaged, limit switch LS1 closes to shunt switch level Y and to maintain flip-flop circuit FF15 in its "off" condition. Selector switches SS9 through SS13 in FIGS. 7–9 are provided with similar limit switches LS2 through LS6 operable by the respective inked clutches of press units Nos. 2 through 6 for similar purposes.

If power fails or is turned off when the press is running, it is necessary to reset the system when power is reapplied so that the circuits will operate in their proper sequence. For this purpose, power-off contact PO in the lower left-hand portion of FIG. 5 is provided. When power is reapplied, contact PO closes momentarily, that is, closes and reopens to reset the system as hereinafter described. While means for operating contact PO may take various forms, one way would be to energize a power off relay operating coil across the power supply lines when power is reapplied to the system to close contact PO and to provide a timer or another series of relays which operate in sequence when power is reapplied to provide a short time delay at the end of which the last relay of such series disconnects the power off relay operating coil from the lines to open contact PO.

Contact PO upon closure applies positive voltage through reset conductor RC to "off" input terminal b of master trip flip-flop FF4 in FIG. 5 to reset the latter in the event it had heretofore been operated. Such positive voltage is also applied from conductor RC to the lower input terminal of amplifier W. This causes amplifier W, shown in detail in FIG. 15, to apply positive voltage through conductor 36 to "off" input terminals e, c and c of flip-flops FF1, FF2 and FF3, respectively, to reset the feeder control circuit. Amplifier W also applies positive voltage through conductor 42 to "off" input terminal j of BRU preset flip-flop FF5 to reset the latter in the event power failed during blanket roll-up operation. When flip-flop FF5 resets, it applies positive voltage from output terminal g through conductor 44 to "off" input terminal e of BRU "on" flip-flop FF6 to reset the latter. Positive voltage is also applied from reset conductor RC to "off" input terminals b of counter driver flip-flop FF7 and impression lockout flip-flop FF8 to reset these flip-flops. Upon being reset, flip-flop FF6 restores amplifier W1 whereby the latter applies ground potential through conductor 52 to NOT circuits N6, N7 and N8 in FIG. 6. This causes the three NOT circuits to apply positive voltages to reset terminals e of counter flip-flops FF9, FF10 and FF11 to reset the blanket roll-up counter to zero minus one condition.

Positive voltage is further applied from reset conductor RC in FIG. 5 through conductor 136 to the unit sequence "off" control circuits in FIGS. 6, 7, 8 and 9. As shown in FIGS. 6 and 7, conductor 136 applies positive voltage to the "off" input terminals of flip-flops FF12 and FF13 to operate the plate-off control circuit of press unit No. 1. In a similar manner positive voltage is applied from conductor 136 to the "off" input terminals of flip-flops FF14 and FF15 in the ink-off control circuit, flip-flops FF16 and FF17 in the impression-off control circuit and flip-flop FF18 in the preset-off control circuit of press unit No. 1.

As shown schematically in FIGS. 7, 8 and 9, conductor 136 extends in the right-hand direction and is connected to reset the pairs of flip-flops in the plate-off, ink-off and impression-off control circuits of press units Nos. 2–6 and is connected to reset the single flip-flop in the preset-off control circuits of press units Nos. 2–5 at the same time and in the same manner as described in connection with press unit No. 1.

While the system hereinbefore described is effectively adapted to fulfill the objects stated, it is to be understood that we do not intend to confine our invention to the particular embodiment of timing and sequencing control system disclosed, inasmuch as it is susceptible of various modifications without departing from the scope of the appended claims.

We claim:

1. In a system providing a timing cycle for unit sequence control of a plural-unit processing machine of the type wherein the machine units are run in synchronism and articles to be worked on are fed into the first unit in spaced relation according to the operating cycle of said first unit and are transported therefrom to and through successive machine units, each machine unit having an operating cycle for performing one of a succession of working steps on the articles and the operating cycles of successive machine units being out of phase with the operating cycles of their immediately preceding machine units in accordance with the time required to transport an article therebetween;

control signal producing means operating in synchronism with the machine for providing electrical timing signals corresponding in-time to the phase conditions of the machine units;

and means responsive to said timing signals for rendering said machine units operable in sequence according to said out of phase conditions whereby each machine unit performs its working step when an article arrives thereat and the working steps of the plurality of units are distributed in time.

2. In a system providing for timed unit sequence control of a sheet-fed plural-unit printing press wherein the press units are run in synchronism with one another and sheets to be printed are fed into the first press unit in spaced relation according to the operating cycle of said first unit and are conveyed therefrom to and through successive press units, said press units having operating cycles for performing sequential printing steps on the sheets and the operating cycles of successive press units being out of phase with the operating cycles of their immediately preceding press units in accordance with the time required to convey a sheet through one unit to the next unit:

means operated in synchronism with the press for providing a plurality of time-spaced control signals for each revolution of the press indicative of predetermined angular positions of a press cylinder;

means for performing a starting control;

means responsive to said starting control for initiating the feeding of sheets into the first press unit;

means also responsive to said starting control for presetting the first press unit for operation to a print-enabling condition;

means responsive to said timed control signals when said first press unit has been preset for operation for rendering the latter operable so that it will perform a printing step upon the arrival of a sheet therein;

and means for preventing said timed control signal from rendering succeeding press units operable before the arrival of a sheet therein that was printed by the first press unit comprising:

a preset-on circuit for each succeding press unit;

means effective when each preceding press unit has been rendered operable for operating the preset-on circuit of the succeeding press unit to apply a preset signal to said succeeding press unit;

and means responsive to said timed control signals after the respective preset signals have been applied for rendering the succeeding press unit operable in said out of phase sequence.

3. The invention defined in claim 2, wherein said means for performing a starting control comprises:

a sheet feeder control circuit;

a trip-slow switch having an off position and first and second operating positions;

means in said feeder control circuit operable when said trip-slow switch is turned to its first operating position when the press is running at a low speed for initiating the feeding of sheets into the press;

and control means operable when said trip-slow switch is turned from its first to its second operating position for causing acceleration of the press and for transmitting a preset signal to the first press unit.

4. The invention defined in claim 3, wherein said means for initiating the feeding of sheets comprises:

means operable when said trip-slow switch is turned or tripped from its second operating position to its off position for stopping the feeding of sheets.

5. The invention defined in claim 4, wherein said first press unit presetting means comprises:

means operable when said trip-slow switch is turned off as aforesaid for presetting the first press unit for operation to a non-printing condition;

and means responsive to said timed control signals when said first press unit has been preset for a non-printing condition for operating the latter so that it will not thereafter print sheets.

6. The invention defined in claim 5, together with:

a preset-off control circuit for each succeeding press unit;

means effective when each preceding press unit has been rendered into its non-printing condition for operating the preset-off control circuit of the succeeding press unit to transmit a preset-off signal to the latter;

and means responsive to said timed control signals and said preset-off signals for rendering the succeeding press units into non-printing conditions in an out of phase sequence.

7. The invention defined in claim 6, wherein said means for stopping the feeding of sheets comprises:

means for transmitting a first signal to said accelerating control means to preset the latter for decelerating the press when all press units are in non-printing conditions;

means operable when the last press unit is rendered into non-printing condition for transmitting a second signal to said accelerating means;

and means responsive to said first and second signals for causing deceleration of the press to a slow speed.

8. The invention defined in claim 2, together with:

a feeder-trip switch at a press unit;

means responsive to operation of said feeder-trip switch for stopping the feeding of sheets;

means also responsive to operation of said feeder-trip switch for rendering the press units into non-printing conditions in an out of phase sequence under the control of said timed control signals;

and means operable when the last press unit is in non-printing condition for decelerating the press to a slow speed.

9. The invention defined in claim 2, together with:

a master-trip switch at a press unit;

means responsive to operation of said master-trip switch for stopping the feeding of sheets;

means also responsive to operation of said master-trip switch for causing immediate deceleration of the press to a slow speed;

and means further responsive to operation of said master-trip switch for simultaneously presetting all press units for operation to non-printing conditions under the control of said timed control signals.

10. The invention defined in claim 2, together with:

means operable for controlling pre-inking of the press units without feeding sheets thereto;

and means responsive to operation of said pre-inking control means for rendering the impression functions of the press units ineffective.

11. The invention defined in claim 2, wherein said means for rendering the press units operable comprises means for conditioning said press units for performance of inking and impression functions together with:

manually controllable electrical means for each press unit operable to control application of rolling pressure to the printing plate of the respective press unit;

and means responsive to operation of said manually controllable means for rendering the inking and impression functions of the respective press unit ineffective.

12. The invention defined in claim 2, wherein said means for rendering the press units operable comprises means for conditioning said press units for performance of inking and impression functions together with:

selector means for each press unit operable to control operation of the respective press unit;

means operable in the first position of said selector means for rendering the inking function of the respective press unit ineffective;

and means operable in the second position of said selector means for rendering the respective press unit into non-printing condition.

13. In a system providing for timed unit-sequence control of a sheet-fed plural-unit offset printing press wherein the press units are run in synchronism with one another and one sheet to be printed is fed into the first press unit for each revolution thereof, each press unit being provided with a plate cylinder and inking rolls for applying ink to the printing plate thereon and a blanket cylinder for receiving the image from the printing plate and an impression cylinder for controlling printing of the image from the blanket cylinder onto the sheet, the press being further provided with transfer cylinders between press units for conveying the sheets from one press unit to the next one in consecutive order, the press units being arranged so that the travel time of a sheet from a given point in one press unit to a like point in the next press unit is more than one revolution and less than two revolutions of a press unit to afford distribution relative to time of the printing functions thereof thereby requiring that the successive press units be conditioned for performance of their printing functions in an out of phase sequence, the improvement comprising:

a plurality of printing function control circuits for each press unit comprising a plate-on and an ink-on and an impression-on control circuit operable in sequence for conditioning the press unit so that it will thereafter apply pressure between the blanket and plate cylinders, apply ink to the printing plate and apply pressure between the impression and blanket cylinders respectively at the proper times in accordance with press unit rotation;

means in each said plate-on and ink-on and impression-on control circuit requiring application of a preset signal and a timing signal at the same time to cause operation thereof;

a preset-on control circuit for each press unit except the first press unit operable to apply a preset signal to the plate-on control circuit thereof and comprising means requiring application of a preset signal and a timing signal at the same time to cause operation thereof;

means operable in synchronism with the press for providing a plurality of timing signals for each revolution of the press;

connection means for applying during each revolution of the press timing signals to the plate-on and ink-on and impression-on control circuits of each press unit in that order in spaced relation sequence and for applying the plate-on timing signals of the successive press units in reverse spaced relation order with respect to said consecutive order;

connection means for applying during each revolution of the press timing signals to the preset-on control circuits of successive press units in spaced relation to and after the impression-on timing signals of the respectively preceding press units and after the plate-on timing signals of the respectively associated press units;

manually controllable means operable when the press is running for initiating the feeding of sheets into the first press unit;

means responsive to operation of said manually operable means for applying a preset signal to the plate-on control circuit of the first press unit to afford operation of the latter by its timing signal when next applied thereto;

means in each plate-on control circuit responsive to operation thereof for applying a preset signal to the associated ink-on control circuit to afford operation of the latter by its timing signal when next applied thereto;

means in each ink-on control circuit responsive to operation thereof for applying a preset signal to the associated impression-on control circuit to afford operation of the latter by its timing signal when next applied thereto;

means in each impression-on control circuit except the impression-on control circuit of the last press unit responsive to operation thereof for applying a preset signal to the preset-on control circuit of the next press unit to afford operation thereof by its timing signal when next applied thereto;

the plate-on control circuits of the press units succeeding the first press unit being unresponsive to their timing signals until they have been conditioned for operation by preset signals from the respectively associated preset-on control circuits;

and the aforementioned delayed application of timing signals to the preset-on control circuits after the plate-on timing signals of the respectively associated press units have been applied on corresponding revolutions of the press causing delay of more than one press revolution in the operation of such plate-on control circuits from the times that the impression-on control circuits of the respectively preceding press units are operated thereby to condition the successive press units for performance of their printing functions in said out of phase sequence so that a sheet entering the first press unit will be printed by all the press units in sequence as it passes therethrough.

14. The invention defined in claim 13, together with: a plurality of non-printing function control circuits for each press unit comprising a plate-off and an ink-off and an impression-off control circuit operable in sequence for conditioning the press unit so that it will thereafter not apply pressure between the blanket and plate cylinders, not apply ink to the printing plate and not apply pressure between the impression and blanket cylinders, respectively, when the press units continue to run;

means in each plate-off and ink-off and impression-off control circuit requiring application of a present signal and a timing signal at the same time to cause operation thereof;

a preset-off control circuit for each press unit except the first press unit operable to apply a preset signal to the plate-off control circuit thereof and comprising means requiring application of a preset signal and a timing signal at the same time to cause operation thereof;

connection means for applying during each revolution of the press timing signals to the plate-off and ink-off and impression-off control circuits of each press unit in that order in spaced relation sequence and for applying the plate-off timing signals of the successive press units in reverse spaced relation order with respect to said consecutive order;

connection means for applying during each revolution of the press timing signals to the preset-off control circuits of successive press units in spaced relation to and after the impression-off timing signals of the respectively preceding press units and after the plate-off timing signals of the respectively associated press units;

control means operable when the press is running for stopping the feeding of sheets into the first press unit;

means responsive to operation of said control means for applying a preset signal to the plate-off control circuit of the first press unit to afford operation of the latter by its timing signal when next applied thereto;

means in each plate-off control circuit responsive to operation thereof for applying a preset signal to the associated ink-off control circuit to afford operation of the latter by its timing signal when next applied thereto;

means in each ink-off control circuit responsive to operation thereof for applying a preset signal to the associated impression-off control circuit to afford operation of the latter by its timing signal when next applied thereto;

means in each impression-off control circuit responsive to operation thereof for applying a preset signal to the associated preset-off control to afford operation of the latter by its timing signal when next applied thereto;

the plate-off control circuits of the press units succeeding the first press unit being unresponsive to their timing signals until they have been conditioned for operation by present signals from the respectively associated preset-off control circuits;

and the aforementioned delayed application of timing signals to the preset-off control circuits after the plate-off timing signals of the respectively associated press units have been applied on corresponding revolutions of the press causing delays of more than one press revolution in the operation of such plate-off control circuits from the times that the impression-off control circuits of the respectively preceding press units are operated thereby to render the successive press units into non-printing condition in a similar out of phase sequence.

15. In a system providing a timing cycle for unit sequence control of a plural-unit processing machine of the type wherein the machine units are run in synchronism and articles to be worked on are fed into the first unit in spaced relation according to the working cycle of said first unit and are transported therefrom to and through successive machine units, said machine units having working cycles for performing sequential working steps on the articles and the working cycles of successive machine units being out of phase with the working cycles of their immediately preceding units by having phase displacements of more than one and less than two working cycles according to the time required to transport an article from one unit to another;

means for initiating operation of the machine and for feeding articles into the first machine unit;

means for putting said first machine unit through its working cycle when the first article passes therethrough;

means for preventing succeeding machine units from going through their working cycles until the first article arrives thereat comprising:

a preset-on circuit for each succeeding machine unit;

means responsive to operation of each preceding machine unit for operating the preset-on circuit of the succeeding machine unit thereby to condition said succeeding machine unit for operation by a timing signal;

and means operated in synchronism with a machine unit for providing a plurality of timing signals for operating each successive machine unit through its working cycle after the aforesaid conditioning thereof by its preset-on circuit.

16. In a system providing a timing cycle for unit sequence control of a plural-unit printing press of the rotary type wherein the press units are run in synchronism with one another and sheets are fed into the first press unit in spaced relation so that one sheet passes through the first press unit during each revolution thereof and said sheets are transported by transfer cylinders from each press unit to the next one, said printing press being constructed to provide successive press units a phase displacement such that transporting of a sheet from a given point in one press unit to a corresponding point in the next press unit in terms of press unit revolutions requires more than one and less than two revolutions whereby some of the printing control functions such as plate-on, ink-on and impression-on of the plurality of press units are distributed in time as the press runs, the improvement comprising:

electroresponsive devices for each press unit for performing enabling functions whereby to enable the press unit to perform said printing control functions as it rotates;

means operable when the press is started running and the feeding of sheets thereinto is initiated for operating said electroresponsive devices of the press units in their proper sequence so that said enabling functions of each press unit are performed when the first sheet arrives therein and comprising:

means for preventing operation of the electroresponsive device operating means of succeeding press units during the revolution that the electroresponsive device operating means of a preceding press unit are being operated comprising:

presetting means for the electroresponsive device operating means of each press unit following the first press unit operable for conditioning the same for operation, said presetting means requiring two signals at the same time for operation thereof, one of which is a timing signal and the other of which is a preset signal indicating that the electroresponsive device operating means of the preceding press unit have been operated;

means operating in synchronism with a press unit for providing during each revolution thereof electrical timing signals for controlling said electroresponsive device operating means of all the press units when preset and said presetting means;

means responsive to operation of the electroresponsive device operating means of each press unit for transmitting a preset signal to condition the presetting means of the next press unit for response to a timing signal;

and said timing signal providing means comprising means for applying the timing signal to each presetting means at a later point in the revolution than the timing signal is applied to the electroresponsive device operating means of the associated press unit whereby operation of the latter will be delayed until the next revolution to coincide with arrival of the first sheet therein.

References Cited by the Examiner

UNITED STATES PATENTS

| | | | |
|---|---|---|---|
| 2,615,393 | 10/52 | Albrecht | 101—184 |
| 2,714,351 | 8/55 | Koch | 101—184 |
| 2,893,310 | 7/59 | Johnson | 101—182 |
| 3,031,622 | 4/62 | Kirchner et al. | 328—75 |
| 3,093,797 | 6/63 | Lubkin | 328—61 |

EUGENE R. CAPOZIO, *Primary Examiner.*